(12) United States Patent
Tahir

(10) Patent No.: US 12,745,136 B2
(45) Date of Patent: Sep. 22, 2026

(54) TRAFFIC-BASED ACTIVATION OF CARRIER AGGREGATION

(71) Applicant: DISH Wireless L.L.C., Englewood, CO (US)

(72) Inventor: Wahaj Tahir, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 238 days.

(21) Appl. No.: 18/394,807

(22) Filed: Dec. 22, 2023

(65) Prior Publication Data

US 2025/0212063 A1 Jun. 26, 2025

(51) Int. Cl.

| | |
|---|---|
| ***H04B 17/336*** | (2015.01) |
| ***H04L 1/00*** | (2006.01) |
| ***H04L 5/00*** | (2006.01) |
| ***H04W 28/24*** | (2009.01) |

(52) U.S. Cl.

CPC ........... *H04W 28/24* (2013.01); *H04L 1/0007* (2013.01); *H04L 5/001* (2013.01); *H04L 5/0037* (2013.01)

(58) Field of Classification Search

CPC ............................ H04W 28/24; H04L 5/0037

See application file for complete search history.

(56) References Cited

U.S. PATENT DOCUMENTS

| | | | | |
|---|---|---|---|---|
| 9,565,676 | B1 * | 2/2017 | Kothari | H04W 72/0453 |
| 9,807,766 | B1 * | 10/2017 | Pawar | H04L 5/001 |
| 10,129,175 | B1 * | 11/2018 | Manchanda | H04L 5/0098 |
| 10,764,336 | B1 * | 9/2020 | Raghunathan | H04L 65/1069 |
| 11,202,292 | B1 * | 12/2021 | Parihar | H04L 5/0053 |
| 11,317,457 | B1 * | 4/2022 | Marupaduga | H04W 76/15 |
| 2013/0051331 | A1 * | 2/2013 | Bao | H04W 28/24 370/329 |
| 2014/0247802 | A1 * | 9/2014 | Wijting | H04W 72/0453 370/329 |
| 2016/0119917 | A1 * | 4/2016 | Yang | H04W 72/23 370/336 |
| 2019/0036673 | A1 | 1/2019 | Chen et al. | |
| 2019/0140793 | A1 * | 5/2019 | Takeda | H04J 11/00 |
| 2020/0045581 | A1 | 2/2020 | Dong et al. | |
| 2021/0266896 | A1 * | 8/2021 | Choi | H04L 5/001 |
| 2021/0282145 | A1 | 9/2021 | Sundararajan et al. | |
| 2022/0116161 | A1 * | 4/2022 | Jones | H04W 72/23 |

OTHER PUBLICATIONS

International Search Report and Written Opinion for International Application No. PCT/US2024/061568, mailed Mar. 20, 2025, 15 Pages.

* cited by examiner

*Primary Examiner* — Zhiren Qin

(74) *Attorney, Agent, or Firm* — Lowenstein Sandler LLP

(57) ABSTRACT

Technologies for scheduling carrier aggregation (CA) for a user equipment (UE) of a cellular network are described. One method of operating a scheduler of a radio access network includes determining a payload size of user data to be exchanged with the UE over a channel. The method further includes analyzing a plurality of parameters associated with a quality-of-service (QOS) requirement of the UE, a quality of the channel, and a plurality of component carriers available at a plurality of bandwidths. The method further includes determining whether and when to activate carrier aggregation (CA) for the UE using at least one additional component carrier of the plurality of component carriers based on the payload size and values of the plurality of parameters.

19 Claims, 21 Drawing Sheets

FIG. 5C

TRAFFIC-BASED ACTIVATION OF CARRIER AGGREGATION

BACKGROUND

One type of cellular network is a Fifth generation (5G) wireless network. In a 5G wireless network, a 5G Core Network (5G core) is responsible for managing and routing data traffic, providing various network resources and services, and supporting the core functionalities of a 5G network. Fifth generation (5G) wireless networks have the promise to provide higher throughput, lower latency, and higher availability compared with previous global wireless standards. A combination of control and user plane separation (CUPS) and multi-access edge computing (MEC), which allows compute and storage resources to be moved from a centralized cloud location to the "edge" of a network and closer to end user devices and equipment, may enable low-latency applications with millisecond response times. A control plane may include a part of a network that controls how data packets are forwarded or routed. The control plane may be responsible for populating routing tables or forwarding tables to enable data plane functions. A data plane (or forwarding plane) may include a part of a network that forwards and routes data packets based on control plane logic. Control plane logic may also identify packets to be discarded and packets to which a high quality of service should apply. 5G wireless user equipment (UE) may communicate over both a lower frequency Sub-6 GHz band between 410 MHz and 7125 MHz and a higher frequency mmWave band between 24.25 GHz and 52.6 GHz.

In some situations, when different UEs connect to the 5G network, allocated bandwidth may limit the ability to service higher bandwidth activity such as streaming video or gaming. Thus, 5G technology has developed carrier aggregation (CA) in which multiple carrier components (CC), each with a certain bandwidth and within a certain frequency band, may be combined for certain UEs. Such combining of CCs, otherwise known as resource allocation, may also improve a carrier channel that is experiencing interference or quality issues. All of these improvements combine to provide a better user experience, but at the expense of network capacity. When CA is performed, for example, fewer UEs are able to connect to the 5G network through a given 5G network cell. At times, therefore, CA may exclude some UEs or unnecessarily cause congestion for other UEs when CA activation is not properly managed.

BRIEF DESCRIPTION OF THE DRAWINGS

The present disclosure is illustrated by way of example, and not by way of limitation, in the figures of the accompanying drawings.

FIG. 5A-FIG. 5D depicts a radio access network according to various embodiments.

DETAILED DESCRIPTION

Figure 1A:
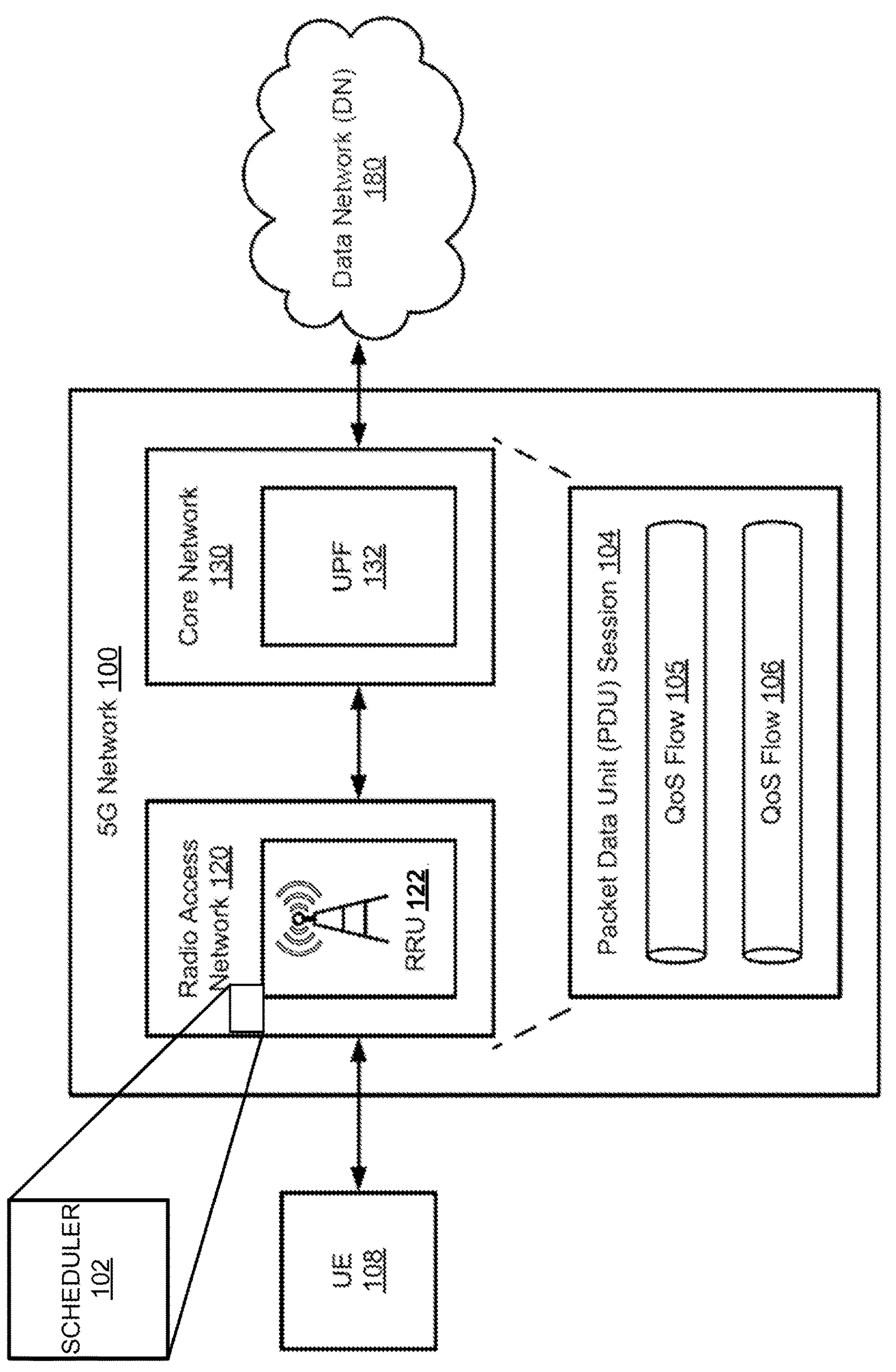
FIG. 1A depicts a 5G network including a radio access network (RAN), which includes a scheduler, and a core network according to at least one embodiment.

Technologies for scheduling carrier aggregation (CA) based on traffic loads within a telecommunications network, such as a cellular network (e.g., 5G wireless network, 6G wireless network) are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

As described above, during resource allocation, a 5G network may activate CA for particular user equipment (UEs) connected to a 5G network cell by combining component carriers (CCs) that have different bandwidths and frequency bands. For example, in some cases of performing CA, CCs are combined that have different frequency ranges to generate a larger bandwidth depending on network conditions and CC availability. All of these improvements combine to provide a better user experience, but at the expense of network capacity. As described above, when CA is performed, fewer UEs are able to connect to the 5G network through a given 5G network cell that includes a radio unit for wirelessly communicating with the UEs. At times, therefore, CA excludes some UEs that would otherwise be serviced or unnecessarily cause congestion for other UEs when CA activation is not properly managed.

To provide additional specificity, the management of CA activation may vary across different algorithmic approaches, depending on application or preference for a given radio access network (RAN). For example, one algorithm manages CA activation in a round-robin fashion, where each UE is given a fair share of radio resources, regardless of the QoS requirements or channel quality for each UE. As another example, CA activation may be managed according to weighted fair queuing, which allocates radio resources to UEs based on their QoS requirements and channel quality. For example, UEs with higher QoS requirements or better channel quality are given more radio resources. As a third example, CA activation may be managed according to maximum throughput, which allocates radio resources to UEs in a way that maximizes the overall throughput of the network. Thus, UEs that can support higher data rates are given more radio resources. None of these algorithmic approaches to CA activation management, alone, avoids degrading network capacity and causing network congestion when activating CA. Further, some of these management approaches may be counterproductive in improving overall user experience for the greatest number of UEs.

Aspects and embodiments of the present disclosure address the above and other deficiencies by scheduling CA for one or more UEs based on network traffic loads and other parameters associated with a cellular network. In some embodiments, the radio access network (RAN) associated with a cell may include a scheduler, which for purposes of this disclosure, may also act as a CA manager. For example, the distributed unit (DU) or a combination of the DU and a centralized unit (CU) of the RAN may include the scheduler that may be configured to determine whether and when to activate CA, and if activated, which CCs to aggregate. Thus, in addition to determining whether and when to activate CA, the scheduler may also determine, based on the payload size and values of the plurality of parameters, how many component carriers to combine when activating CA. Situating the scheduler in the RAN may position the logic and processing of scheduling and managing CA activation closer to the UEs that CA activation will impact.

In various embodiments, analyzing the network traffic load may include considering a payload size to be exchanged with a particular UE, which may be considered as a percentage of the overall load of a 5G connected cell. Further, in some embodiments, the other parameters to be considered along with payload size may include a combination of a quality-of-service (QOS) requirement for the UE, a quality of the current channel over which the UE is communicating, and availability of a plurality of components carriers (CCs) having a plurality of bandwidths. Each CC may have a different bandwidth and frequency, for example, and thus aggregating (or combining) some CCs may enhance the bandwidth and throughput of user data depending on demand and radio resources that are available. In some embodiments, the scheduler determines whether and when to activate CA for the UE using at least one additional component carrier of the plurality of CCs based on the payload size and values of the plurality of parameters. In some embodiments, the plurality of parameters also include a mobility level of the UE, an energy efficiency level of the UE, and/or a cost impact of operating the cellular network, which will be discussed in more detail.

Aspects and embodiments of the present disclosure may also configure the scheduler to analyze the payload size along with values of the plurality of parameters to determine how many CCs to aggregate in performing CA, when CA is activated. In at least some embodiments, the scheduler further determines a maximum value of the payload size before activating the CA based on a page resource block (PRB) utilization level, a maximum number of UEs supportable by a connected cell, data volume, and data throughput of a plurality of channels of the connected cell. These factors will be discussed in more detail.

Therefore, advantages of the systems and methods implemented in accordance with some embodiments of the present disclosure include, but are not limited to, providing a more granular and fine-tuned determination of scheduling CA that also at least considers payload size in addition to other criteria and parameters. Thus, the benefits of improving QoS and overall user experience of UE users, e.g., by selectively increasing bandwidth and throughput, while avoiding the usual downsides of CA, which include reduction of network capacity (e.g., fewer UEs can be serviced) and reduction of network congestion.

FIG. 1A depicts a 5G network 100 including a radio access network (RAN) 120 and a core network 130 according to at least one embodiment. In at least one embodiment, a scheduler 102 (e.g., a CA scheduler/manager) can be implemented in the RAN 120 to schedule and manage CA activation as described herein. The RAN 120 can include a new-generation radio access network (NG-RAN) that uses the 5G new radio interface (NR). The 5G network 100 connects user equipment (UE) 108 to the data network (DN) 180 using the RAN 120 and the core network 130. The data network 180 can include the Internet, a local area network (LAN), a wide area network (WAN), a private data network, a wireless network, a wired network, or a combination of networks. The UE 108 can include an electronic device with wireless connectivity or cellular communication capability, such as a mobile phone 110 or handheld computing device 112. In at least one example, the UE 108 can include a 5G smartphone or a 5G cellular device that connects to the RAN 120 via a wireless connection. The UE 108 can include one of a number of UEs not depicted that are in communication with the RAN 120. The UEs may include mobile and non-mobile computing devices. The UEs may include laptop computers, desktop computers, an Internet-of-Things (IoT) devices, and/or any other electronic computing device that includes a wireless communications interface to access the RAN 120.

The RAN 120 includes a remote radio unit (RRU) 122 for wirelessly communicating with UE 108. The remote radio unit (RRU) 122 can include a Radio Unit (RU) and may include one or more radio transceivers for wirelessly communicating with UE 108. The remote radio unit (RRU) 122 may include circuitry for converting signals sent to and from an antenna of a Base Station into digital signals for transmission over packet networks. The RAN 120 may correspond with a 5G radio Base Station that connects user equipment to the core network 130. The 5G radio Base Station may be referred to as a generation Node B, a “gNodeB,” or a “gNB.” A Base Station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions 140 (FIG. 1C) may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions can include the access and mobility management function (AMF), the session management function (SMF), and a user plane function (UPF), all of which may provide user session capability and user data. The UPF (e.g., UPF 132) may perform packet processing including routing and forwarding, quality of service (QOS) handling, and packet data unit (PDU) session management. The UPF 132 may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for an UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice can include an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the RAN 120, such as a Distributed Unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than ~1.2 milliseconds (ms)).

In some embodiments, the Distributed Unit (DU) and the centralized unit (CU) of the RAN 120 may be co-located with the remote radio unit (RRU) 122. In other embodiments, the Distributed Unit (DU) and the remote radio unit (RRU) 122 may be co-located at a cell site and the centralized unit (CU) may be located within a local data center (LDC).

The 5G network 100 may provide one or more network slices, where each network slice may include a set of network functions that are selected to provide specific telecommunications services. For example, each network slice can include a configuration of network functions, network applications, and underlying cloud-based compute and storage infrastructure. In some cases, a network slice may correspond with a logical instantiation of a 5G network, such as an instantiation of the 5G network 100. In some cases, the 5G network 100 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance. In some cases, the 5G network 100 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

A cloud-based compute and storage infrastructure can include a networked computing environment that provides a cloud computing environment. Cloud computing may refer to Internet-based computing, where shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a set of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element can include a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine can include a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 100 may implement various network functions, such as the core network functions and radio access network functions, using a cloud-based compute and storage infrastructure. A network function may be implemented as a software instance running on hardware or as a virtualized network function. Virtual network functions (VNFs) can include implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1A, the core network 130 includes a user plane function (UPF) 132 for transporting IP data traffic (e.g., user plane traffic) between the UE 108 and the data network 180 and for handling packet data unit (PDU) sessions with the data network 180. The UPF 132 can include an anchor point between the UE 108 and the data network 180. The UPF 132 may be implemented as a software process or application running within a virtualized infrastructure or a cloud-based compute and storage infrastructure. The 5G network 100 may connect the UE 108 to the data network 180 using a PDU session 104, which can include part of an overlay network.

The PDU session 104 may utilize one or more quality of service (QOS) flows, such as QoS flows 105 and 106, to exchange traffic (e.g., data and voice traffic) between the UE 108 and the data network 180. The one or more QoS flows can include the finest granularity of QoS differentiation within the PDU session 104. The PDU session 104 may belong to a network slice instance through the 5G network 100. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The RAN 120 may be configured to establish and release parts of the PDU session 104 that cross the radio interface.

The RAN 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transmit and receive radio signals using multiple-input multiple-output (MIMO) antennas that may be connected to a cell tower, an antenna mast, or a raised structure.

Referring to FIG. 1A, the UPF 132 may be responsible for routing and forwarding user plane packets between the RAN 120 and the data network 180. Uplink packets arriving from the RAN 120 may use a general packet radio service (GPRS) tunneling protocol (or GTP) to reach the UPF 132. The GPRS tunneling protocol for the user plane may support multiplexing of traffic from different PDU sessions by tunneling user data over the interface between the RAN 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before being forwarded towards the appropriate RAN 120. A QOS flow may correspond with a stream of data packets that have equal quality of service (QoS). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1B, during setup of the PDU session 104. The SMF may generate the set of SDF templates using information provided from a policy control function (PCF), such as the PCF 135 depicted in FIG. 1C. The UPF 132 may track various statistics regarding the volume of data transferred by each PDU session, such as PDU session 104, and provide the information to an SMF.

Figure 1B:
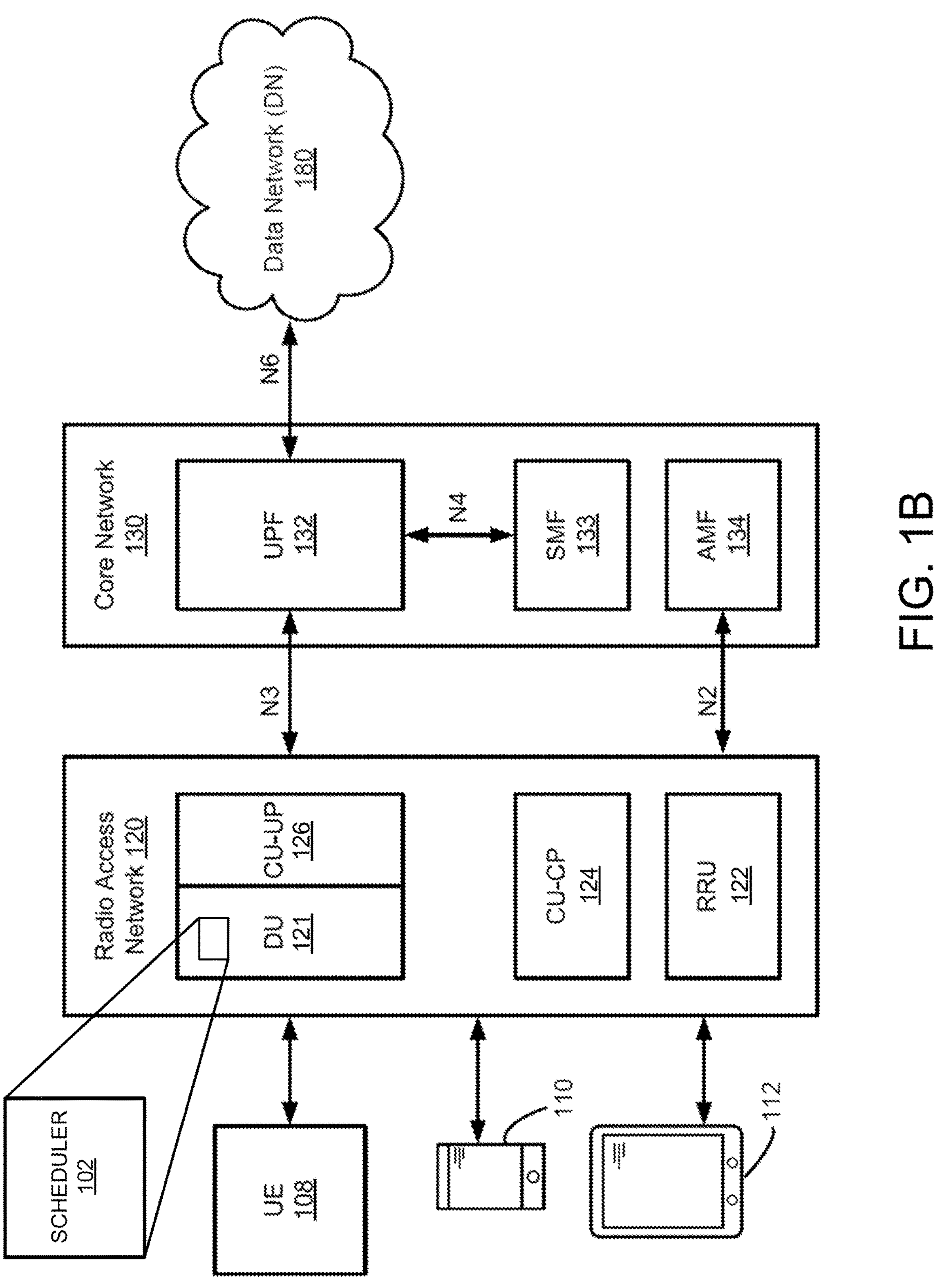
FIG. 1B-FIG. 1C depict a radio access network, which includes a scheduler, and a core network for providing a communications channel (or channel) between user equipment and a data network according to various embodiments.

FIG. 1B depicts a RAN 120, which includes the scheduler 102, and a core network 130 for providing a communications channel (or channel) between user equipment and data network 180 according to at least one embodiment. The communications channel can include a pathway through which data is communicated between the UE 108 and the data network 180. The user equipment in communication with the RAN 120 includes UE 108, mobile phone 110, and mobile computing device 112. The user equipment may include a set of electronic devices, including mobile computing devices and non-mobile computing devices.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions, to include authenticate the UE 108, assign the UE 108 an IP address, and create a session for the UE 108. The AMF may interface with a network slice selection function (NSSF) (not depicted) to select network slice instances for user equipment, such as UE 108. When user equipment is leaving a first coverage area and entering a second coverage area, the AMF 134 may be responsible for coordinating the handoff between the coverage areas whether the coverage areas are associated with the same radio access network or different radio access networks. The SMF 133 may also manage security of the UE 108 and ensure that user data is protected.

The UPF 132 may transfer downlink data received from the data network 180 to user equipment, such as UE 108, via the RAN 120 and/or transfer uplink data received from user equipment to the data network 180 via the RAN 120. An uplink can include a radio link through which user equipment transmits data and/or control signals to the RAN 120. A downlink can include a radio link through which the RAN 120 transmits data and/or control signals to the user equipment. The UPF 132 may thus be responsible for functions such as packet routing, packet forwarding, and packet filtering.

The RAN 120 may be logically divided into a remote radio unit (RRU) 122, a Distributed Unit (DU) 121, and a centralized unit (CU) that is partitioned into a CU user plane portion (CU-UP) 126 and a CU control plane portion (CU-CP) 124. The CU-UP 126 may correspond with the centralized unit for the user plane and the CU-CP 124 may correspond with the centralized unit for the control plane. The CU-CP 124 may perform functions related to a control plane, such as connection setup, mobility, and security. The CU-UP 126 may perform functions related to a user plane, such as user data transmission and reception functions. Additional details of radio access networks are described in reference to FIG. 5A.

In some embodiments, the scheduler 102 is located within the DU 121, although in other embodiments, the scheduler is located with the CU, e.g., either or both of the CU-CP 124 and CU-UP 126. In the context of the scheduler 102, the AMF 134 may provide the scheduler 102 with the QoS requirements of the UE 108. The scheduler 102 may then use this information to determine which CCs to aggregate and how to allocate radio resources to each CC. The SMF 133 can monitor the QoS of the UE 108 and report any problems to the scheduler 102. The CU and/or the DU 121 can then adjust the radio resource allocation to improve QoS. The UPF 132 may forward user plane traffic over the aggregated CCs. The scheduler 102 may schedule the transmission of data over the aggregated CCs and the UPF 132 may ensure that the data is delivered to the correct destination, e.g., the UE 108 or the data network 180. Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The RAN 120 may be connected to the AMF 134, which may allocate temporary unique identifiers, determine tracking areas, and select appropriate policy control functions (PCFs) for user equipment, via an N2 interface. The N3 Interface may be used for transferring user data (e.g., user plane traffic) from the RAN 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The RAN 120 may be connected to the SMF 133, which may manage UE context and network handovers between Base Stations, via the N2 interface. The N2 interface may be used for transferring control plane signaling between the RAN 120 and the AMF 134.

The RRU 122 may perform physical layer functions, such as employing orthogonal frequency-division multiplexing (OFDM) for downlink data transmission. In some cases, the DU 121 may be located at a cell site (or a cellular Base Station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer can include the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular Base Stations) and 180 different RRUs.

In some embodiments, the RAN 120 or portions of the RAN 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 121 and CU-UP 126 may be executed as virtual instances within a data center environment that provides single-digit millisecond latencies (e.g., less than 2 ms) from the virtual instances to the UE 108.

Figure 1C:
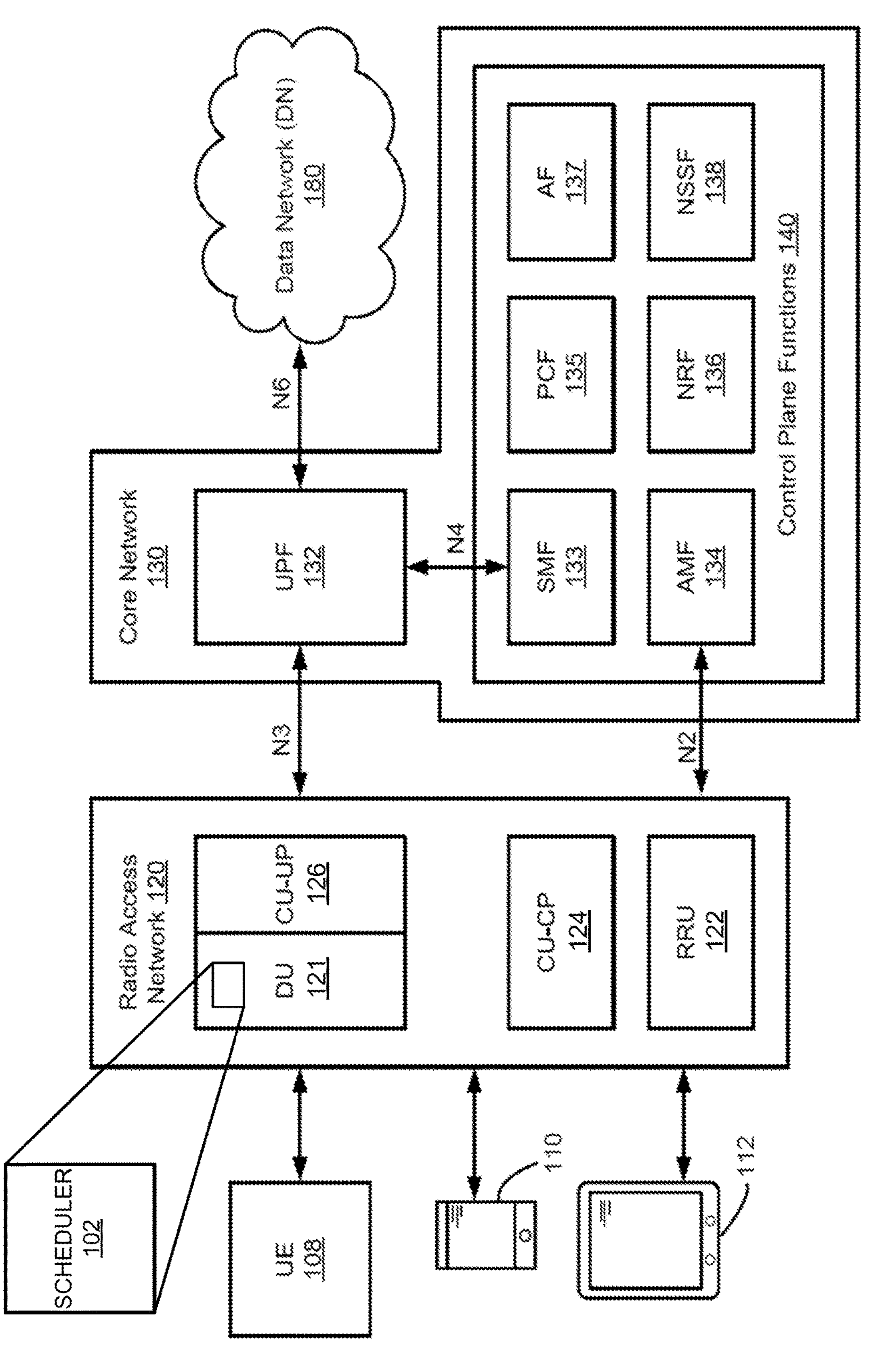

FIG. 1C depicts a RAN 120, which includes the scheduler 102, and a core network 130 for providing a communications channel (or channel) between user equipment and data network 180 according to at least one embodiment. The core network 130 includes UPF 132 for handling user data in the core network 130. Data is transported between the RAN 120 and the core network 130 via the N3 Interface. The data may be tunneled across the N3 Interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 including SMF 133, AMF 134, PCF 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, where each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs 132 for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The RAN 120 may provide separation of the centralized unit for the control plane (CU-CP) 124 and the centralized unit for the user plane (CU-UP) 126 functionalities while supporting network slicing. The CU-CP 124 may obtain resource utilization and latency information from the DU 121 and/or the CU-UP 126, and select a CU-UP 126 to pair with the DU 121 based on the resource utilization and latency information in order to configure a network slice. Network slice configuration information associated with the network slice may be provided to the UE 108 for purposes of initiating communication with the UPF 132 using the network slice.

Figure 2:
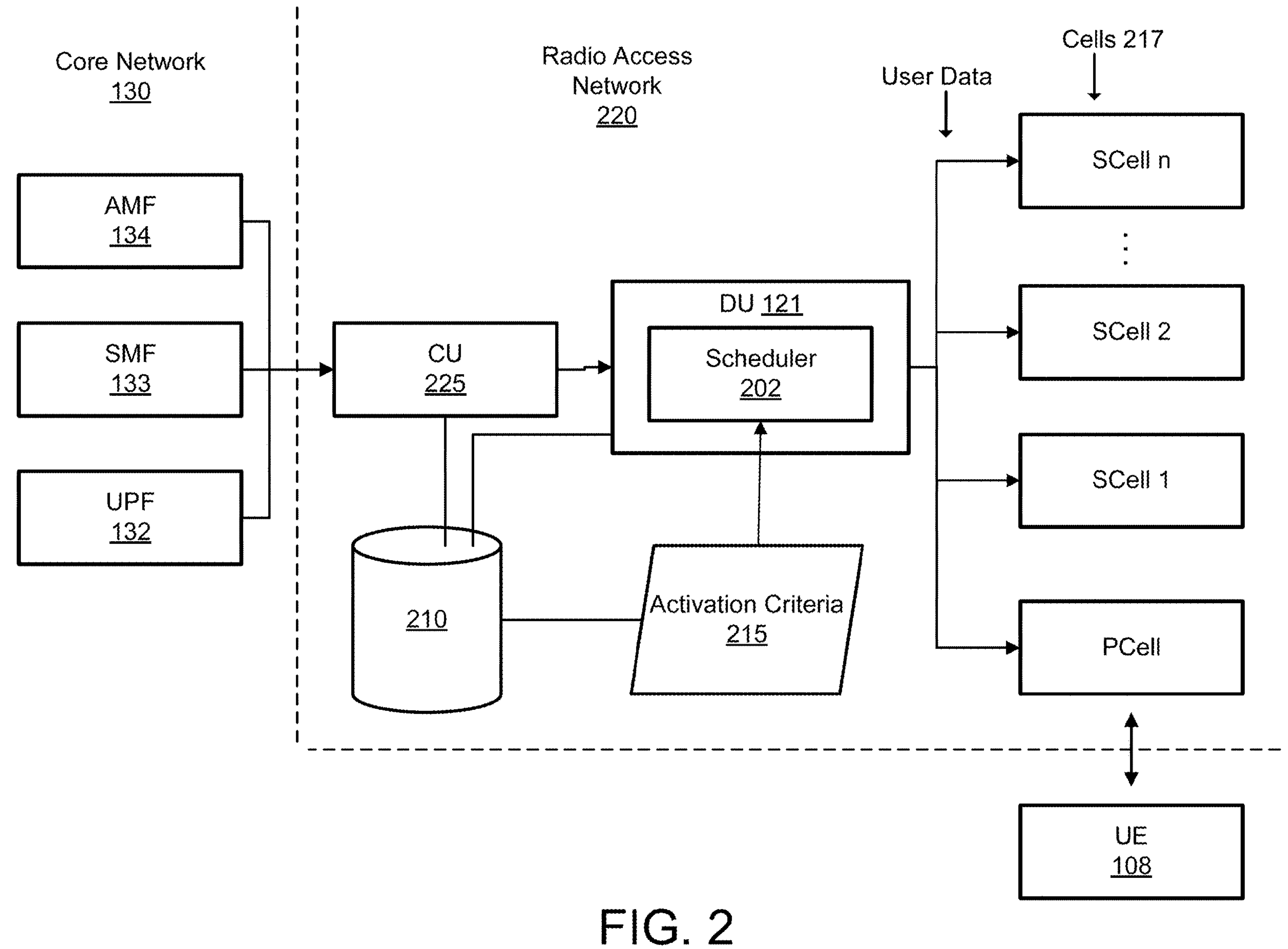
FIG. 2 depicts a radio access network, which includes a scheduler within a distributed unit (DU) according to various embodiments.

FIG. 2 depicts a radio access network (RAN) 220, which includes a scheduler 202 within a distributed unit (DU), e.g., the DU 121 according to various embodiments. In some embodiments, the RAN 220 is the RAN 120 referred to elsewhere in this disclosure, and the scheduler 202 is the scheduler 102 referred to elsewhere in this disclosure. In embodiments, the AMF 134, the SMF 133, and the UPF 132 of the core network 130 exchange information and data with a CU 225 of the RAN 220 and the CU 225 is in turn coupled to the DU 121. The CU 225 may include the CU-CP 124 and the CU-UP 126 in some embodiments.

Current carrier aggregation (CA) algorithms, which were summarized previously, do not take into account overall payload size that needs to be transmitted to the UE 108. Thus, previous management of CA activation has been based primarily on QoS requirements from the UE 108 and channel/resource availability. Even if the size of the payload is manageable on the current channel, but the triggering conditions are satisfied to activate CA, the DU 121 would send the payload over multiple channels, e.g., CCs. This may result in non-optimal use of gNB and UE radio resources. By integrating consideration of payload size, as proposed herein, smaller payloads may be transmitted on a single carrier with higher Modulation and Coding Scheme (MCS), saving radio and power resources for bigger payloads that may require additional power and radio resources to be transmitted.

In various embodiments, the DU 121 exchanges user data and information with various cells 217 in performing resource allocation of one or more component carriers (CCs) provided by the cells 217. This data and information is transmitted by the cells 217 to or received from the UE 108 (or multiple UEs). For example, the cells 217 may include a primary cell (PCell) and a plurality of secondary cells (SCells). A PCell is a main cell through which the UE 108 initially establishes a connection with the RAN 220 and the core network 130. The PCell may be responsible for the control plane signaling that includes connection establishment, release, and handovers.

In various embodiments, the SCells are additional cells added after the initial connection is made through the PCell. These SCells may be used for boosting data rates and bandwidth by providing additional resources for data transfer. Thus, the scheduler 202 may primarily manage and schedule aggregation of CCs through the SCells when activating CA for a given UE 108. In this way, the management of the radio resources of the SCells enables enhancing data throughput and bandwidth.

In embodiments, once the UE 108 is powered on and tries to connect to the RAN 220, the UE 108 looks for the PCell first. After the connection is established through the PCell, the RAN 220, with the aid of the scheduler 202, can configure one or multiple SCells to support the UE 108 based on payload size of user data to be exchanged with the UE 108 and other network parameters such as the radio conditions, including channel quality, and network capacity, e.g., availability of the CCs provided via the SCells, which can be dynamically activated and deactivated. In some embodiments, the payload size and these network parameters (more of which will be discussed hereinafter) are stored in a datastore 210 and provided to the scheduler 202 as activation criteria 215, which may include values of parameters considered when deciding on when and how to activate CA. Additionally, or alternatively, at least some of the activation criteria 215 is provided in real time (e.g., from the core network 130 via the CU 225) to the scheduler 202.

In at least some embodiments, the scheduler 202 determines a maximum value of the payload size before activating the CA based on a physical resource block (PRB) utilization level, a maximum number of UEs supportable by a connected cell (which includes a subset of the cells 217 that are aggregated), data volume, and data throughput of a plurality of channels of the connected cell. In some embodiments, the scheduler 202 determines the maximum value of the payload size by minimizing the PRB utilization and the maximum number of UEs for use in performing CA.

In various embodiments, PRB represents a chunk of resources in the frequency domain used to transmit data in the cellular network. PRB utilization may inform the cellular network of the available radio resources (in terms of frequency) being used at a given time. A PRB may be the smallest unit of resources allocated in the frequency domain, which may include a certain number of subcarriers. The exact number of subcarriers and the width of a PRB can vary based on the subcarrier spacing chosen in the 5G deployment. PRB utilization may refer to the percentage of PRBs that are being used out of the total available PRBs. For instance, if a cell has 100 PRBs and 70 of them are being used, the PRB utilization is 70%. High PRB utilization means that a large portion of the available bandwidth is being used. This can be due to high user demand, large numbers of connected devices, or high data rate applications like video streaming.

In various embodiments, the scheduler 202 activates carrier aggregation (CA) by causing CCs to be devoted to a given UE 108, where those CCs are distributed across multiple SCells. In embodiments, the scheduler 202 activates the CA using one of intra-band contiguous CA, intra-band non-contiguous CA, inter-band CA, or inter-RAT (radio access technology) CA. Intra-band contiguous CA combines multiple carriers (component carriers or CCs) within the same frequency band. These CCs are adjacent to each other, resulting in a wider bandwidth. Intra-band non-contiguous CA combines CCs within the same frequency band, but not adjacent to each other. Inter-band CA combines CCs from different frequency bands. This is especially useful in 5G, given the various frequency bands in which 5G operates. Inter-RAT CA refers to aggregation across different radio access technologies. For instance, a 5G NR (New Radio) carrier could potentially be aggregated with a 4G LTE carrier. In initial 5G deployments, cellular networks may use a dual connectivity setup where the UE 108 can maintain simultaneous connection to 4G (for control plane and possibly data) and 5G (primarily for data). While this may not be pure CA over 5G resources, this approach shares the principle of using multiple channels to enhance performance.

Employment of CA may generally help increase data rates. By aggregating CCs, the effective bandwidth available to users increases, which in turn boosts data rates. Further, CA enables more efficient spectrum utilization, allowing operators to better use fragmented spectrum by aggregating non-contiguous bands. CA may further improve coverage by combining low-frequency bands (with better coverage characteristics) and improve both coverage and capacity of the network with high-frequency bands (with higher data rates).

In various embodiments, at least some UEs are configured to support carrier aggregation, e.g., may be designed with multiple transceivers and the ability to tune to and communicate on different CCs. Thus, when the UE 108 is powered on and connects to the RAN 220, the UE 108 may request CA based on having CA capabilities and the RAN 220 and core network 130 having CA capabilities.

Once the scheduler 202 causes CA to be activated, the scheduler 202 may also allocate radio resources to the UE 108 across the aggregated CCs. This may involve deciding how much data is sent on each CC to maximize throughput and efficiency. Further, the scheduler 202 may also adjust the CC aggregation configuration based on mobility and network load, as will be discussed with reference to FIG. 3. Thus, CA enhances data rates by utilizing multiple carriers, effectively widening the available bandwidth, increasing throughput, and improving network performance. The exact details and procedures for carrier aggregation can vary depending on the specific network, deployment, and equipment used, of which various examples are described herein.

Figure 3:
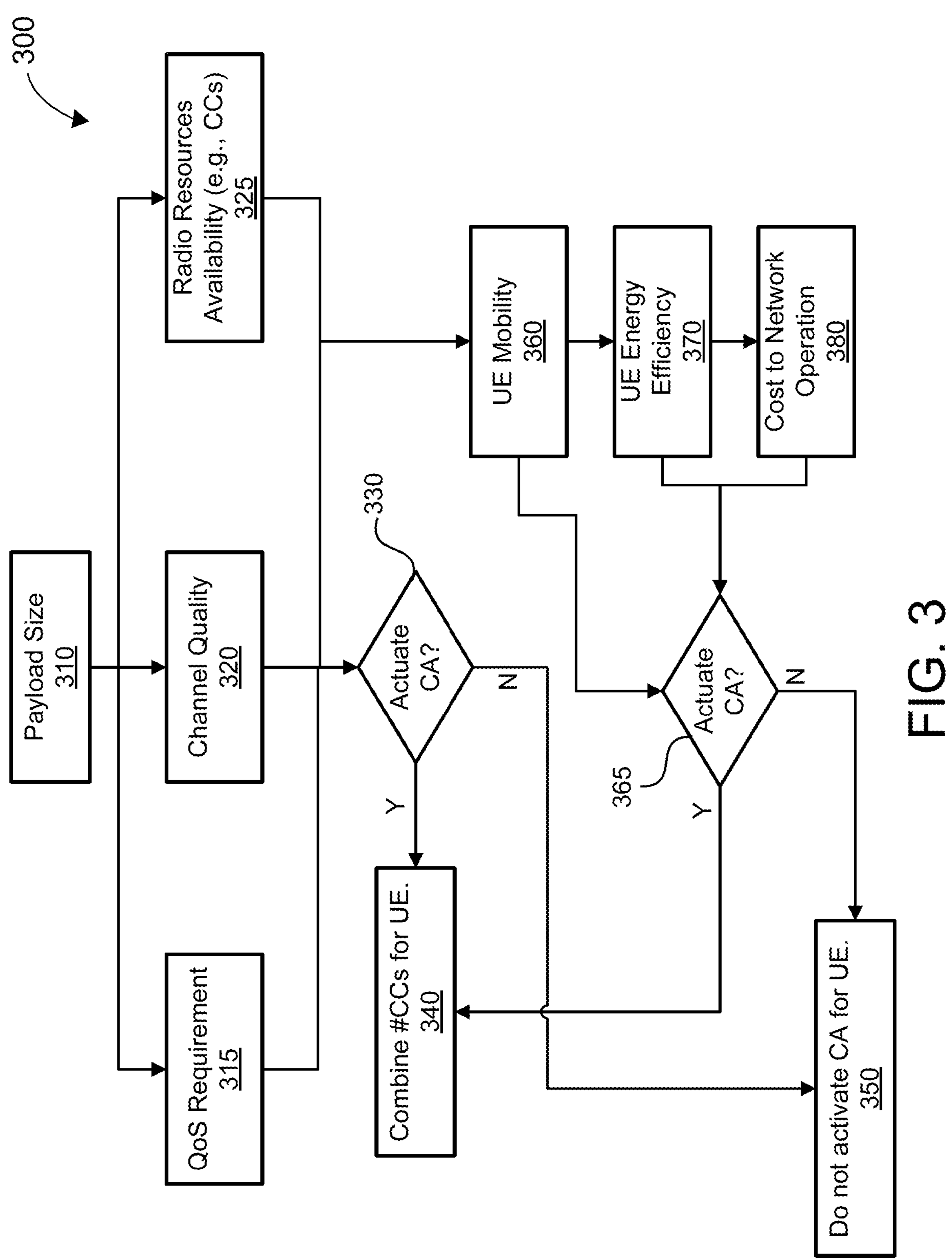
FIG. 3 is a flow diagram of a method of scheduling and managing carrier aggregation (CA) on a UE-basis according to at least some embodiments.

FIG. 3 is a flow diagram of a method 300 of scheduling and managing carrier aggregation (CA) on a UE-basis according to at least some embodiments. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by the DU 121 of FIGS. 1A-1B. In various embodiments, the method 300 is performed by the scheduler 102 or 202. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 310, the processing logic determines a payload size of user data to be exchanged with the UE 108 and takes into account the data load when scheduling CA. If the payload size is large in comparison to an average payload size of other UEs, for example, the processing logic may dedicate more CCs to the UE with the larger payload size. In contrast, if the payload is small in comparison to an average payload size of other UEs, the processing logic forgo or delay CA activation to ensure other UEs meet their QoS and channel quality requirements. Thus, analysis of payload size may be weaved into considerations of other network parameters.

At operation 315, the processing logic determines a QoS requirement of the UE 108, e.g., a level of quality of service required by an application requesting to stream data. In this way, the processing logic takes into account QoS requirements of the UE 108 when scheduling CA. For example, if the UE requires a high data rate, the processing logic may immediately schedule CA activation to aggregate multiple CCs and may immediately activate CA. As a further example, if the UE 108 is streaming a high-definition video, the processing logic can schedule CA to aggregate multiple CCs to increase the data rate. This can help to improve the quality of the video stream and reduce buffering. As still a further example, if the UE 108 is gaming online, the processing logic can schedule CA to aggregate multiple CCs to reduce latency. This can help to improve the responsiveness of the game and give the UE 108 a competitive advantage.

In an example of operation 315, the processing logic determines that the UE is streaming video of a definition that exceeds a threshold value, and thus requires a higher QoS than for other traffic and that involves a higher payload size. In these embodiments, the processing logic may, e.g., at operation 330, immediately activate the CA over multiple component carriers to increase a data rate and/or reduce a latency of streaming the video.

At operation 320, the processing logic determines a quality of the channel over which the UE communicates and takes into account the channel quality when scheduling CA. For example, if the channel quality is poor, the processing logic may schedule CA to aggregate multiple CCs to improve the reliability of the communication link. For example, if the channel quality is less than −115, the processing logic may not schedule 64QAM MCS-based resources to the UE 108 on an existing carrier. As a further example, if the UE 108 is located in an area with poor signal coverage, the processing logic may schedule CA to aggregate multiple CCs from different frequency bands. This can help to improve the reliability of the communication link and reduce the number of dropped calls.

As an example of operation 320, the processing logic determines that a signal coverage from a connected cell is below a threshold value. The processing logic then immediately activates the CA over multiple component carriers from different frequency bands. In some embodiments, the CA decision is made at operation 330.

At operation 325, the processing logic determines available radio resources such as the CCs that have been disclosed, and takes into account these available radio resources when scheduling CA. For example, if there are not enough CCs available to meet all CA demands, the processing logic may not schedule CA for the UE 108. In some embodiments, this decision for a particular UE may be informed by the QoS requirements determined at operation 315 and channel quality determined at operation 320, as weighed with these parameters as well as the payload sizes of other UEs.

In some embodiments, also at operation 325, the processing logic determines that at least one of a level of PRB utilization or a number of connected UEs satisfy a threshold value. In response, the processing logic may, e.g., at operation 330, delay activation of the CA by a predetermined length of time to improve QoS for the UE, where the predetermined length of time may be based on the payload size.

In some embodiments, also at operation 325, the processing logic determines that at least one of a level of PRB utilization or a number of connected UEs does not satisfy a threshold value. The processing logic may, e.g., at operation 330, immediately activate the CA when the payload size also does not satisfy a particular size.

At operation 330, the processing logic determines whether and when to activate CA for the UE 108. The whether connotes that activation of CA may not be efficient, for example, due to the payload size being small and/or other parameter values, such as QoS requirement not being high, and/or the channel quality being high. In some embodiments, activation of CA is scheduled either for immediate activation or to be activated on a delay depending on, for example, channel contention such as how many UEs are trying to connect to the RAN 120.

If, at operation 330, the processing logic determines whether to activate CA, and when, then at operation 340, the processing logic determines, based on the payload size and values of the plurality of parameters determined at operations 315, 320, and 325, how many component carriers (CCs) to combine when activating CA. Also, at operation 330, the CA is scheduled for immediate or delayed activation (to which was alluded previously).

If, at operation 330, the processing logic determines not to activate CA, then at operation 350, the processing logic may decide to not activate CA for the UE 108. Thus, the UE 108 may continue to be supported on the current PCell and potentially a single SCell originally dedicated, and thus may be supported by a single CC.

In some embodiments, additional parameters (or criteria) may be analyzed to make a further informed decision about whether and when to activate CA. For example, at operation 360, the processing logic may determine a level of mobility of the UE 108, e.g., how fast the UE is moving. If the UE 108 is moving quickly, for example, the processing logic may avoid scheduling CA to reduce the number of handovers that are required, e.g., between the SCells.

In some embodiments, at operation 365, the processing logic combines the payload size of the UE with the parameter (or criteria) values determined at operations 315, 320, 325, and 360 to determine whether and when to activate CA. If the weighing of these values dictates to schedule CA, then the processing logic moves back to operation 340 to determine when to activate CA and how many CCs to aggregate. Otherwise, the processing logic passes to operation 350, where CA is not activated.

In some embodiments, at operation 370, the processing logic determines an energy efficiency level of the UE 108 to consider whether this information makes a difference in the decision to schedule CA. For example, if the UE 108 is hot and is not operating with good energy efficiency, then the processing logic may forgo activating CA or may even deactivate CA based on an over-heated UE.

In some embodiments, at operation 365, the processing logic combines the payload size of the UE with the parameter (or criteria) values determined at operations 315, 320, 325, and 370 to determine whether and when to activate CA. If the weighing of these values dictates to schedule CA, then the processing logic moves back to operation 340 to determine when to activate CA and how many CCs to aggregate. Otherwise, the processing logic passes to operation 350, where CA is not activated.

In some embodiments, at operation 380, the processing logic determines a cost to network operation of activating CA for the UE 108. In some embodiments, this cost may be weighed against other costs and other network parameter values to determine whether or when to activate CA.

In some embodiments, at operation 365, the processing logic combines the payload size of the UE with the parameter (or criteria) values determined at operations 315, 320, 325, and 380 to determine whether and when to activate CA. If the weighing of these values dictates to schedule CA, then the processing logic moves back to operation 340 to determine when to activate CA and how many CCs to aggregate. Otherwise, the processing logic passes to operation 350, where CA is not activated.

Figure 4A:
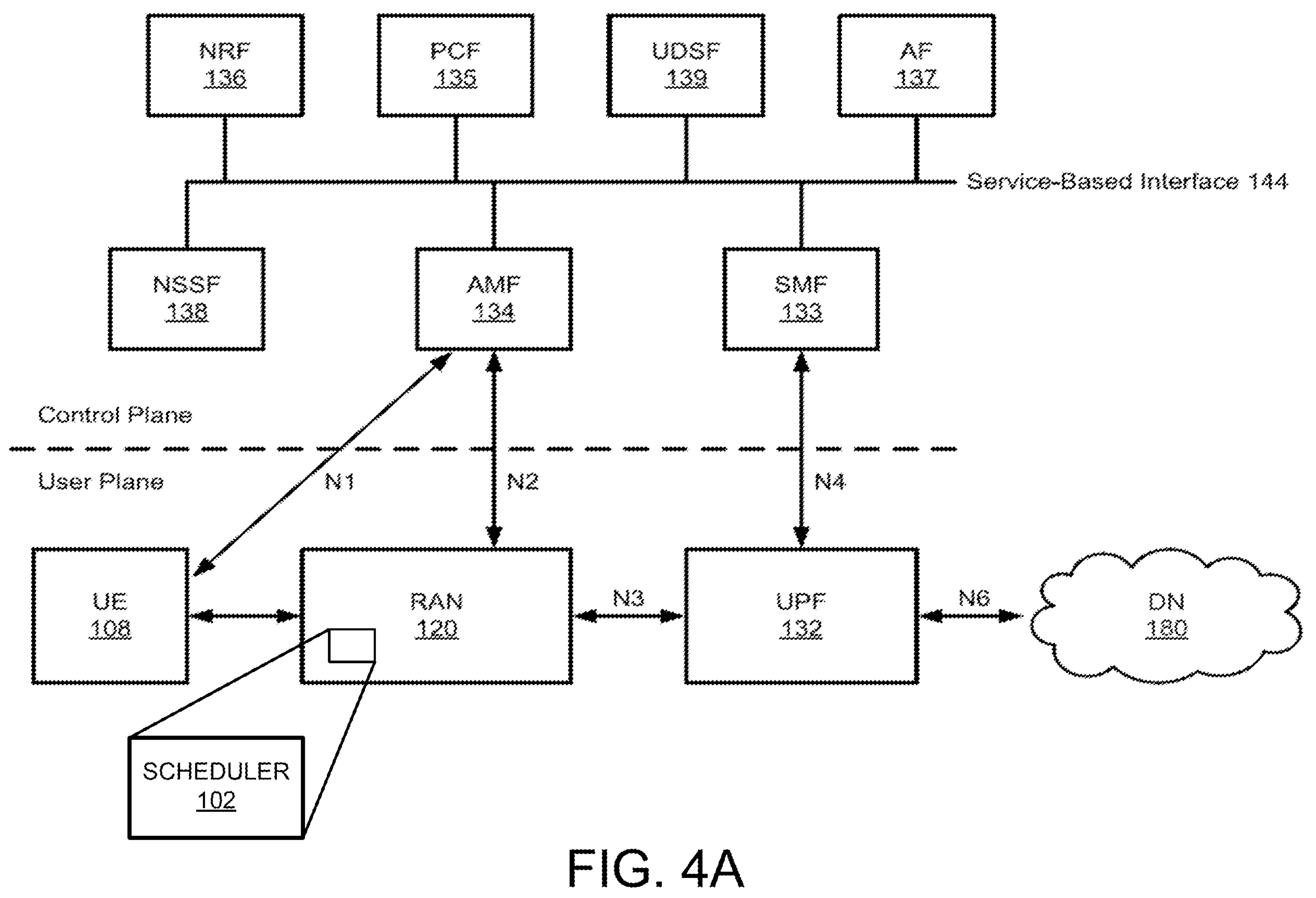
FIG. 4A depicts network functions interacting between user and control planes according to at least one embodiment.

FIG. 4A to FIG. 4E may be understood as an extension to the discussion associated with FIG. 1A to FIG. 1C. FIG. 4A depicts network functions interacting between user and control planes according to at least one embodiment. The logical connections between the network functions depicted in FIG. 4A should not be interpreted as direct physical connections. The RAN 120 is connected to the user plane function UPF 132 via interface N3. The UPF 132 is connected to the data network 180 via the N6 interface. In some cases, the data network 180 may represent an edge computing network or resources, such as a mobile edge computing (MEC) network. The UE 108 connects to the AMF 134, e.g., via the RAN 120 over interface N2 or directly over interface N1. The AMF 134 may be responsible for authentication and authorization of access requests, as well as mobility management functions via the N1 interface. In some embodiments, the scheduler 102 or 202 is located within the RAN 120.

In a service-based view, the AMF 134 may communicate with other network functions through a service-based interface 144 using application programming interfaces (APIs). The SMF 133 can include a network function that is responsible for the allocation and management of IP addresses that are assigned to the UE 108, as well as the selection of the UPF 132 for traffic associated with a particular PDU session for the UE 108. The SMF 133 may also communicate with other network functions through the service-based interface 144 using application programming interfaces (APIs). Each of the network functions NRF 136, PCF 135, UDSF 139, AF 137, NSSF 138, AMF 134, and SMF 133 may communicate with each other via the service-based interface 144 using application programming interfaces (APIs). The unstructured data storage function (UDSF) 139 may provide service interfaces to store, update, read, and delete network function data. Using the UDSF 139, network functions such as the PCF 135, SMF 133, and AMF 134 may remain stateless or primarily stateless.

Figure 4B:
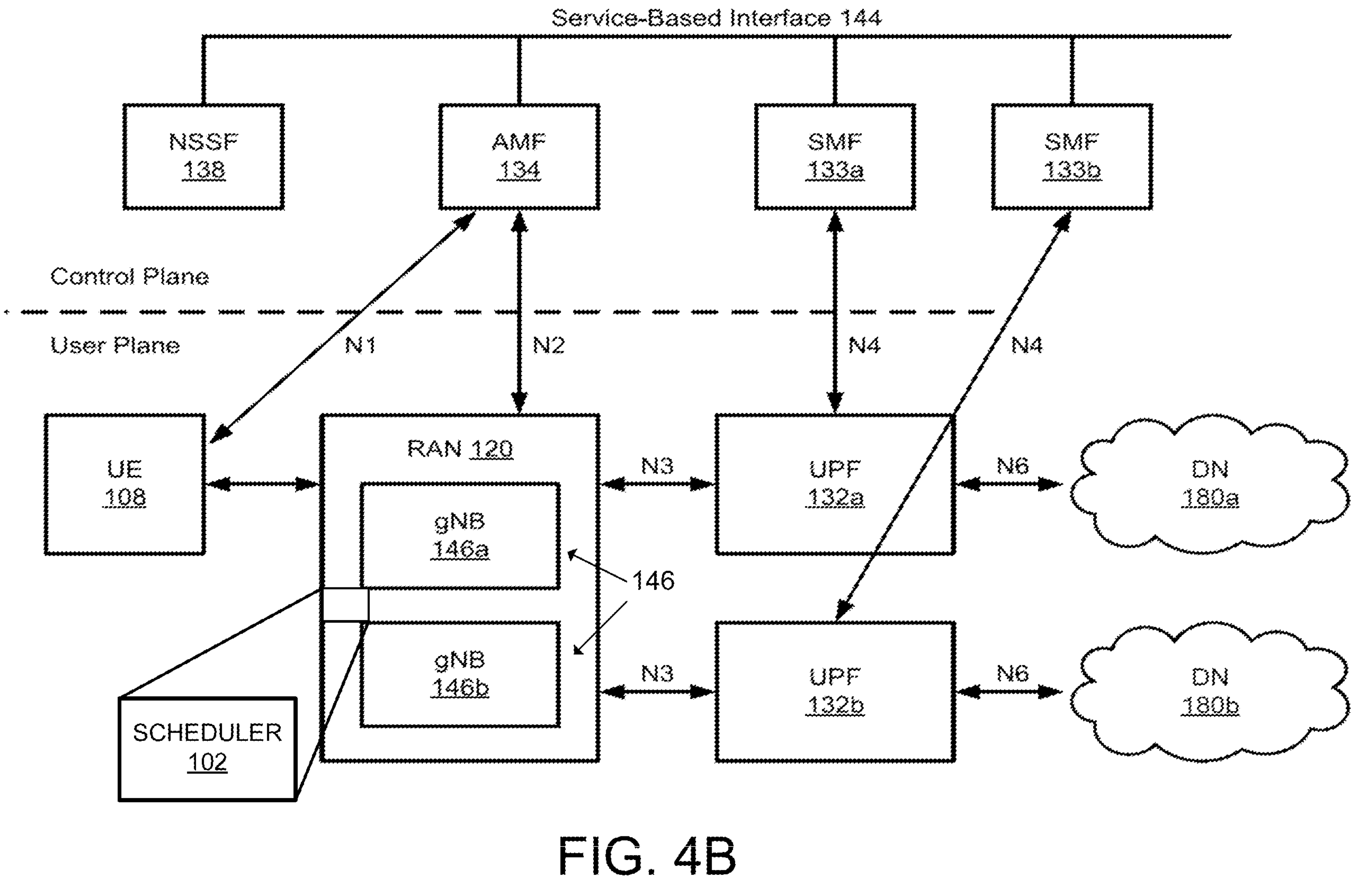
FIG. 4B depicts network functions interacting between user and control planes according to at least one embodiment.

FIG. 4B depicts network functions interacting between user and control planes according to at least one embodiment. As depicted, UPFs 132*a*-132*b* (also referred to as UPFs 132) are in communication with data networks (DNs) 180*a*-180*b* (also referred to as DNs 180). In some cases, a set of UPFs 132 may be connected in series between the RAN 120 and a set of DNs 180. The RAN 120 may include gNBs 146*a*-146*b* (also referred to as gNBs 146). Each gNB 146 can include at least a DU 504, a CU-UP 516, and a CU-CP 514 (see FIG. 5A). In various embodiments, the scheduler 102 or 202 is located in the DU 504 or in a combination of the CU, which includes the CU-UP 516 and the CU-CP 514, and the DU 504.

Multiple PDU sessions to different data networks may be accommodated through the use of multiple UPFs in parallel. For the sake of clarity, some of the network functions depicted in FIG. 4B have been omitted, however it should be understood that the omitted network functions may interact with the network functions depicted in FIG. 4B. Each UPF 132*a*-132*b* may be associated with a PDU session, and may connect to a corresponding SMF 133*a*-133*b* over an N4 interface to receive session control information. If the UE 108 has multiple PDU sessions active, then each PDU session may be supported by a different UPF 132, each of which may be connected to an SMF 133 over an N4 interface. It should also be understood that any of the network functions may be virtualized within a network, and that the network itself may be provided as a network slice.

Figure 4C:
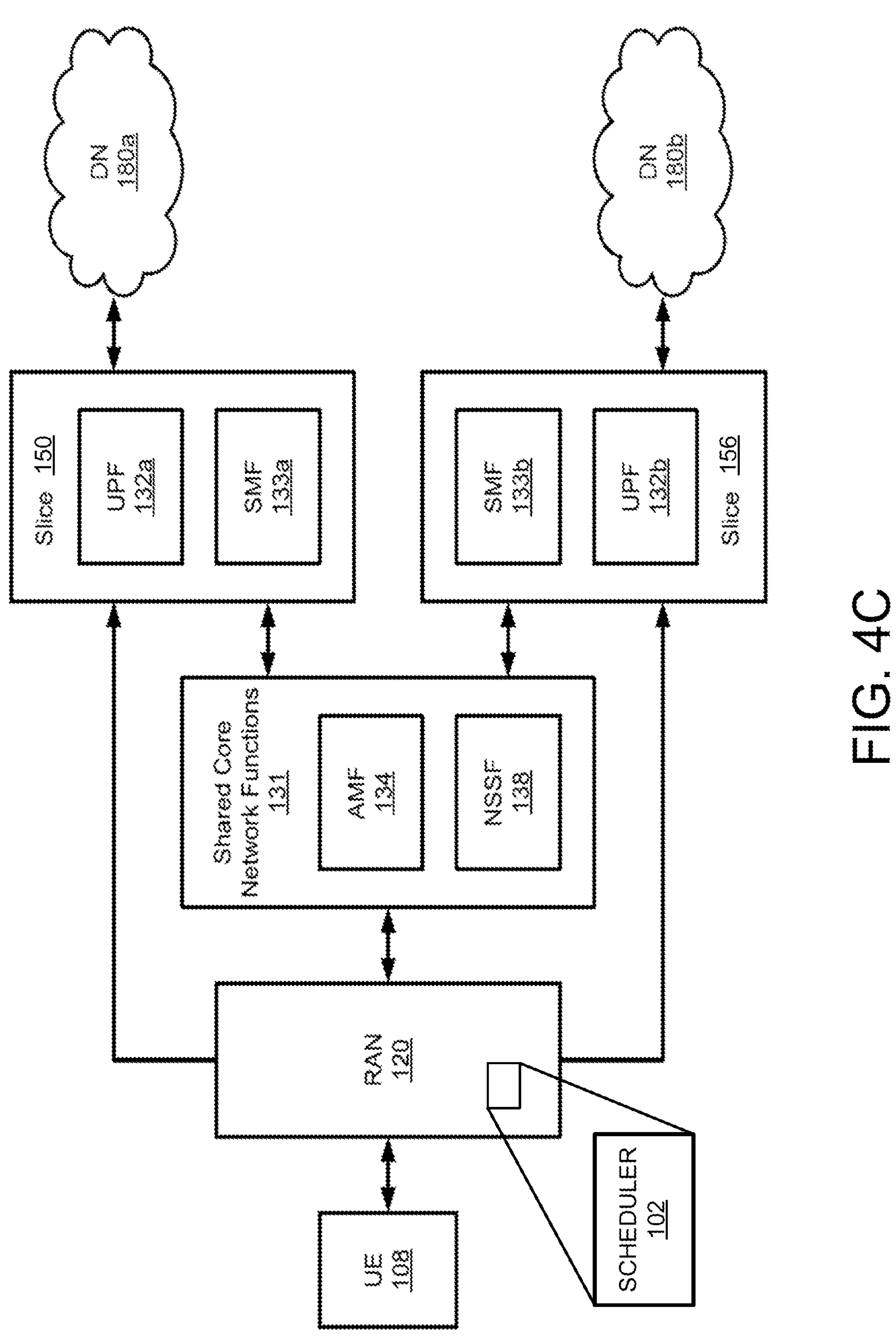
FIG. 4C depicts network slices sharing a set of shared core network functions according to at least one embodiment.

FIG. 4C depicts network slices 150 and 156 (also referred to as network slices) sharing a set of shared core network functions 131 according to at least one embodiment. The set of shared core network functions 131 includes AMF 134 and NSSF 138. The radio access network (RAN) 120 may support differentiated handling of traffic between isolated network slices 150 and 156 for the UE 108. The network slice selection function (NSSF) 138 within the shared core network functions 131 may support the selection of network slice instances to serve the UE 108. In some cases, network slice selection may be determined by the network (e.g., using either NSSF 138 or AMF 134) based on network slice policy. The UE 108 may simultaneously connect to data networks 180*a* and 180*b* via the network slices 150 and 156 to support different latency requirements. In some embodiments, the scheduler 102 or 202 may be located in the RAN 120.

Figure 4D:
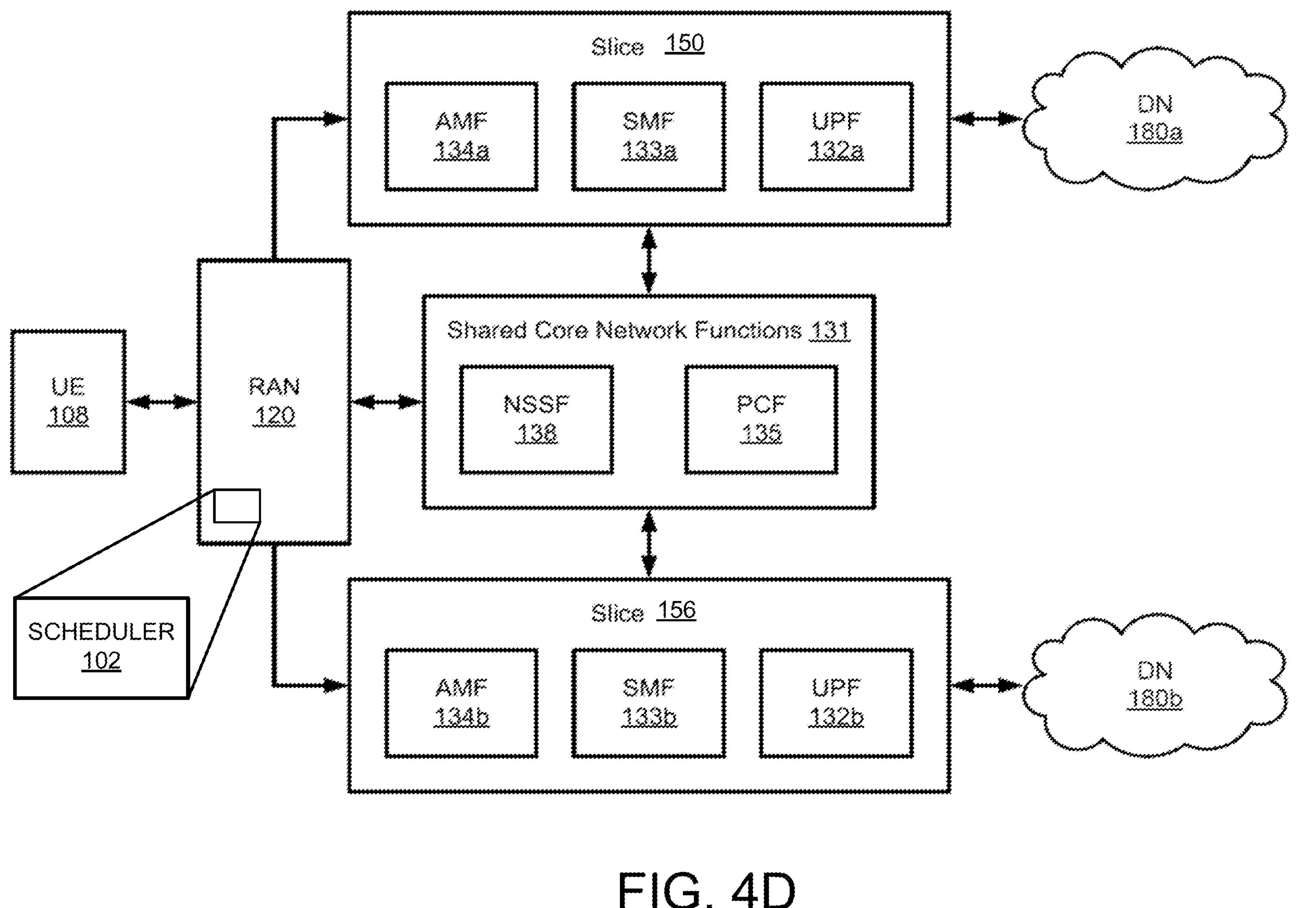
FIG. 4D-FIG. 4E depict network slices after updates have been made based on changes to the network slice policy according to various embodiments.

FIG. 4D depicts network slices 150 and 156 after updates have been made based on changes to the network slice policy according to at least one embodiment. As depicted, the network slices 150 and 156 share a set of shared core network functions 131 that includes PCF 135 and NSSF 138. Each network slice includes an AMF 134, an SMF 133, and a UPF 132. In some embodiments, the scheduler 102 or 202 may be located in the RAN 120.

Figure 4E:
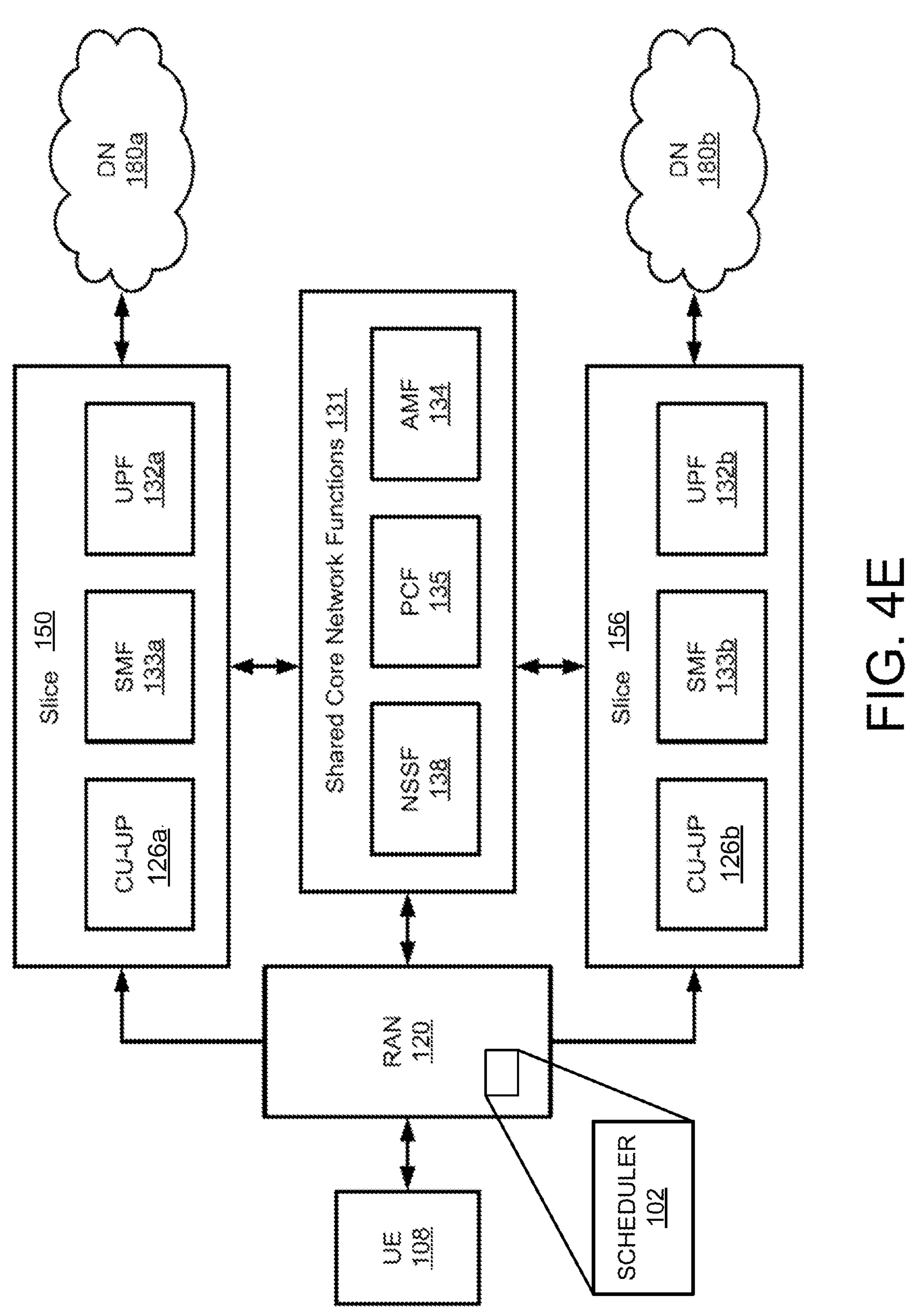

FIG. 4E depicts network slices 150 and 156 after updates have been made based on changes to the network slice policy according to at least one embodiment. As depicted, the network slices 150 and 156 share a set of shared core network functions 131 that includes AMF 134, PCF 135, and NSSF 138. Each network slice includes a CU-UP 126, SMF 133, and a UPF 132; accordingly, network slice 150 includes CU-UP 126*a*, SMF 133*a*, and UPF 132*a* and network slice 156 includes CU-UP 126*b*, SMF 133*b*, and UPF 132*b*. In some embodiments, the scheduler 102 or 202 may be located in the RAN 120.

Figure 5A:
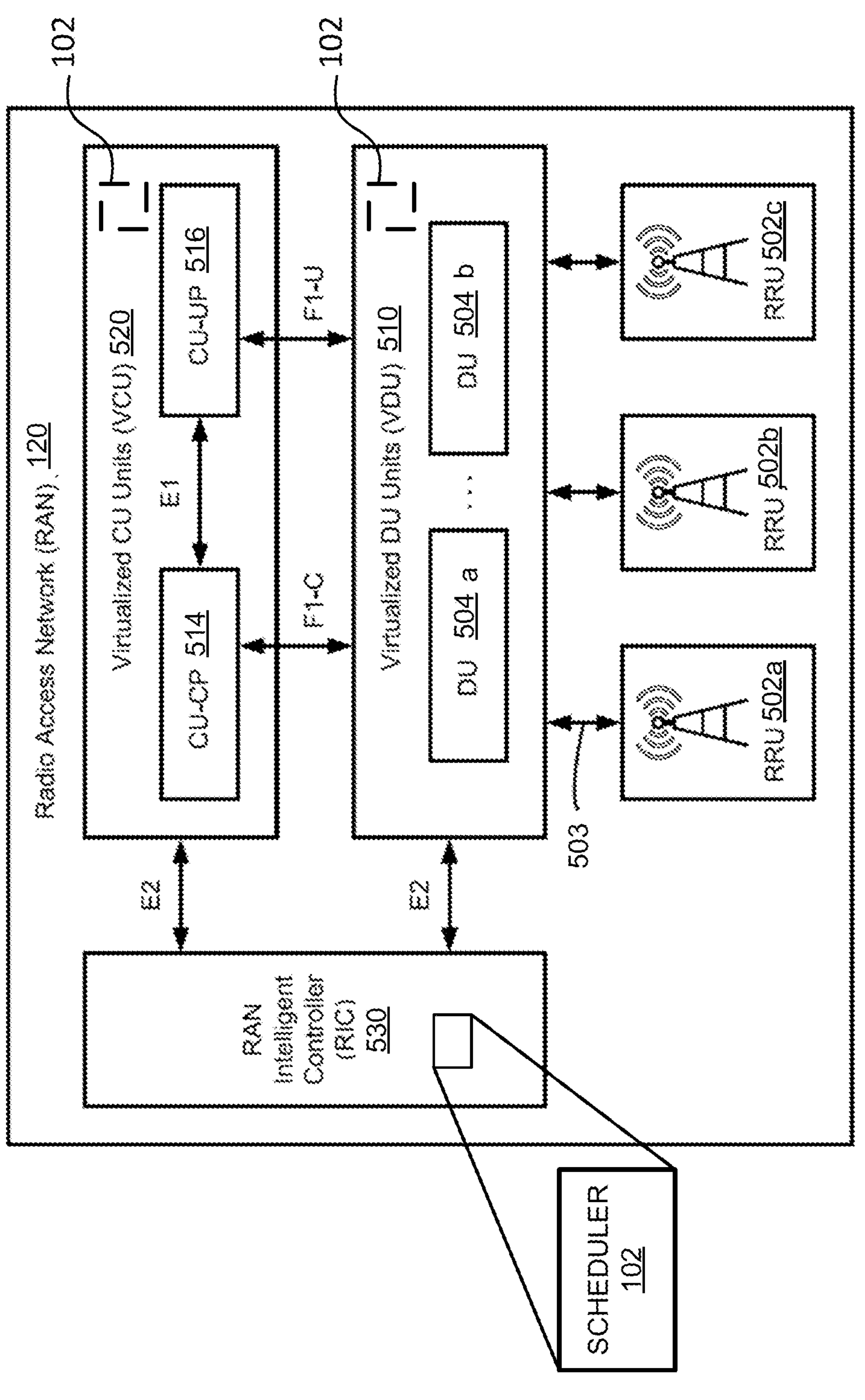

FIG. 5A depicts a RAN 120 according to at least one embodiment. The RAN 120 includes virtualized CU units (VCU) 520, virtualized DU units (VDU) 510, remote radio units (RRUs) 502*a*-502*c*, and a RAN intelligent controller (RIC) 530. In at least one embodiment, the scheduler 102 can be implemented in the RIC 530 to provide CA scheduling and management as described herein. The virtualized DU units 510 can include virtualized versions of distributed units (DUs) 504. The distributed unit (DU) 504 can include a logical node configured to provide functions for the radio link control (RLC) layer, the medium access control (MAC) layer, and the physical layer (PHY) layers. The virtualized CU units 520 can include virtualized versions of centralized units (CUs) including a centralized unit for a user plane CU-UP 526 and a centralized unit for a control plane CU-CP 514. In one example, the centralized units (CUs) can include a logical node configured to provide functions for the radio resource control (RRC) layer, the packet data convergence control (PDCP) layer, and the service data adaptation protocol (SDAP) layer. The centralized unit for the control plane CU-CP 514 can include a logical node configured to provide functions of the control plane part of the RRC and PDCP. The centralized unit for the user plane CU-UP 516 can include a logical node configured to provide functions of the user plane part of the SDAP and PDCP. Virtualizing the control plane and user plane functions allows the centralized units (CUs) to be consolidated in one or more data centers on RAN-based open interfaces. In at least one embodiment, the scheduler 102 can be implemented in the VCU 520 or the VDU 510 to provide CA scheduling and management as described herein.

The remote radio units (RRUs) 502*a*-502*c* may correspond with different cell sites. A single DU may connect to multiple RRUs via a fronthaul interface 203. The fronthaul interface 203 may provide connectivity between DUs and RRUs. For example, DU 504*a* may connect to 18 RRUs via the fronthaul interface 503. A centralized units (CUs) may control the operation of multiple DUs via a midhaul F1 Interface that includes the F1-C and F1-U interfaces. The F1 Interface may support control plane and user plane separation, and separate the Radio Network Layer and the Transport Network Layer. In one example, the centralized unit for the control plane CU-CP 514 may connect to ten different DUs within the virtualized DU units 510. In this case, the centralized unit for the control plane CU-CP 514 may control ten DUs and 180 RRUs. A single Distributed Unit (DU) 504 may be located at a cell site or in a local data center. Centralizing the Distributed Unit (DU) 504 at a local data center or at a single cell site location instead of distributing the DU 504 across multiple cell sites may result in reduced implementation costs.

The centralized unit for the control plane CU-CP 514 may host the radio resource control (RRC) layer and the control plane part of the packet data convergence control (PDCP) layer. The E1 Interface may separate the Radio Network Layer and the Transport Network Layer. The CU-CP 514 terminates the E1 Interface connected with the centralized unit for the user plane CU-UP 516 and the F1-C interface connected with the distributed units (DUs) 504. The centralized unit for the user plane CU-UP 516 hosts the user plane part of the packet data convergence control (PDCP)

layer and the service data adaptation protocol (SDAP) layer. The CU-UP 516 terminates the E1 Interface connected with the centralized unit for the control plane CU-CP 514 and the F1-U interface connected with the distributed units (DUs) DU 504. The distributed units (DUs) 504 may handle the lower layers of the baseband processing up through the packet data convergence control (PDCP) layer of the protocol stack. The interfaces F1-C and E1 may carry signaling information for setting up, modifying, relocating, and/or releasing a UE context.

The RAN intelligent controller (RIC) 530 may control the underlying RAN elements via the E2 Interface. The E2 Interface connects the RAN intelligent controller (RIC) 530 to the distributed units (DUs) 504 and the centralized units CU-CP 514 and CU-UP 516. The RAN intelligent controller (RIC) 530 can include a near-real time RIC. A non-real-time RIC (NRT-RIC) not depicted can include a logical node allowing non-real time control rather than near-real-time control and the near-real-time RIC 530 can include a logical node allowing near-real-time control and optimization of RAN elements and resources on the basis of information collected from the distributed units (DUs) 504 and the centralized units CU-CP 514 and CU-UP 516 via the E2 Interface.

The virtualization of the distributed units (DUs) 504 and the centralized units CU-CP 514 and CU-UP 516 allows various deployment options that may be adjusted over time based on network conditions and network slice requirements. In at least one example, both a Distributed Unit (DU) 504 and a corresponding centralized unit CU-UP 516 may be implemented at a cell site. In another example, a Distributed Unit (DU) 504 may be implemented at a cell site and the corresponding centralized unit CU-UP 516 may be implemented at a local data center (LDC). In another example, both a Distributed Unit (DU) 504 and a corresponding centralized unit CU-UP 516 may be implemented at a local data center (LDC). In another example, both a Distributed Unit (DU) 504 and a corresponding centralized unit CU-UP 516 may be implemented at a cell site, but the corresponding the centralized unit CU-CP 514 may be implemented at a local data center (LDC). In another example, a Distributed Unit (DU) 504 may be implemented at a local data center (LDC) and the corresponding centralized units CU-CP 514 and CU-UP 516 may be implemented at an edge data center (EDC).

In some embodiments, network slicing operations may be communicated via the E1, F1-C, and F1-U interfaces of the RAN 120. For example, CU-CP 514 may select the appropriate DU 504 and CU-UP 516 entities to serve a network slicing request associated with a particular service level agreement (SLA).

Figure 5B:
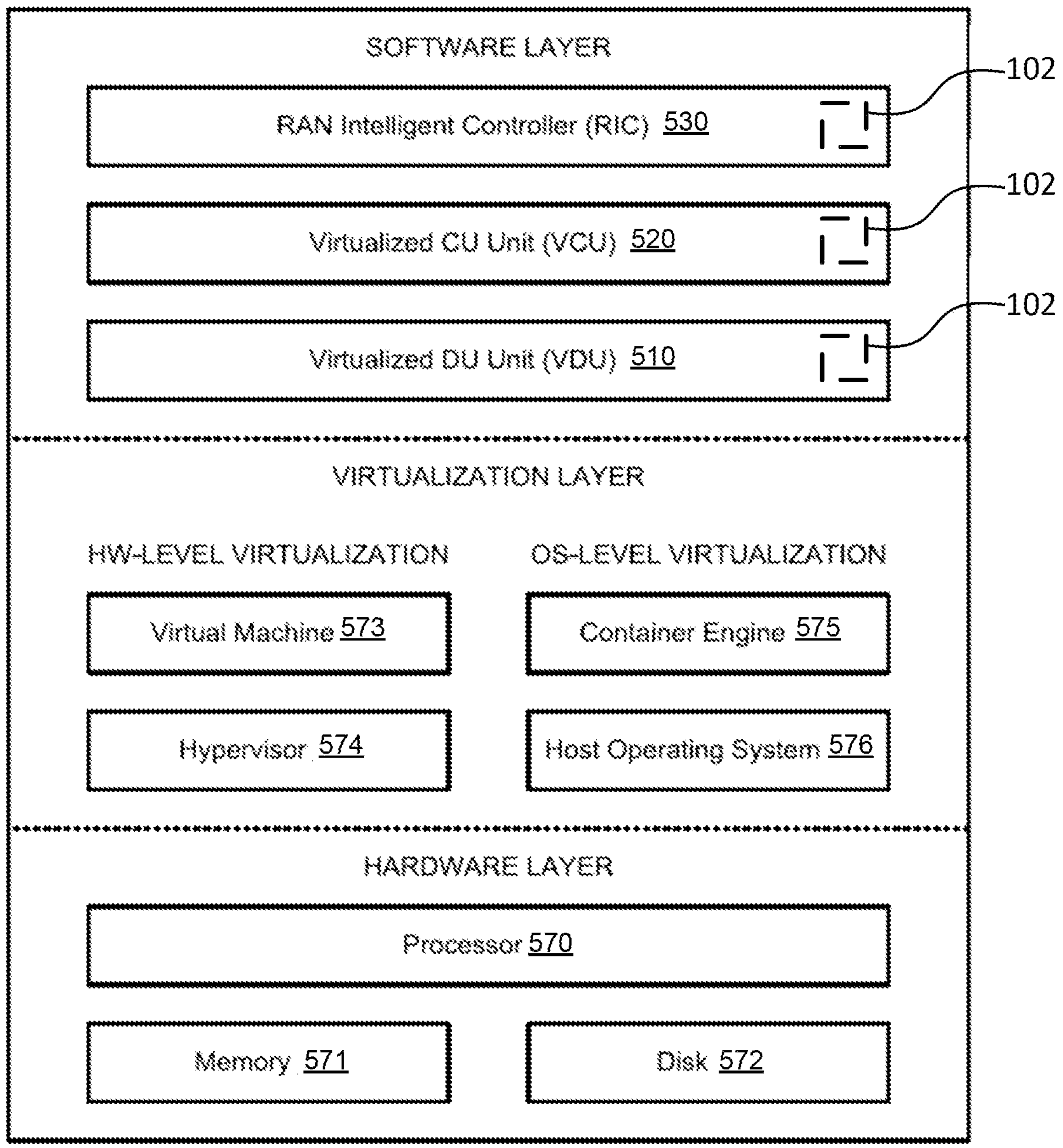

FIG. 5B depicts a RAN 120 according to at least one embodiment. As depicted, the RAN 120 includes hardware-level components and software-level components. The hardware-level components include one or more processors 570, one or more memory 571, and one or more disks 572. The one or more memory 571 can be communicatively coupled with and readable by the one or more processors 570 (or processing devices). The one or more memory 571 can have stored therein processor-readable instructions which, when executed by the one or more processors 570, cause the one or more processors 570 to perform operations described herein. In some embodiments, the one or more memory 571 is non-transitory computer-readable storage medium storing instructions, which when executed by the one or more processors 570 (or processing device), cause the one or more processors 570 (or processing device) to perform particular operations or instructions.

The software-level components include software applications, such as a RAN intelligent controller (RIC) 530, virtualized CU unit (VCU) 520, and virtualized DU unit (VDU) 510. The software-level components may be run using the hardware-level components or executed using processor and storage components of the hardware-level components. In one example, one or more of the RIC 530, VCU 520, and VDU 510 may be run using the processor 570, memory 571, and disk 572. In another example, one or more of the RIC 530, VCU 520, and VDU 510 may be run using a virtual processor and a virtual memory that are themselves executed or generated using the processor 570, memory 571, and disk 572.

The software-level components also include virtualization layer processes, such as virtual machine 573, hypervisor 574, container engine 575, and host operating system 576. The hypervisor 574 can include a native hypervisor (or bare-metal hypervisor) or a hosted hypervisor (or type 2 hypervisor). The hypervisor 574 may provide a virtual operating platform for running one or more virtual machines, such as virtual machine 573. A hypervisor can include software that creates and runs virtual machine instances. Virtual machine 573 may include a set of virtual hardware devices, such as a virtual processor, a virtual memory, and a virtual disk. The virtual machine 573 may include a guest operating system that has the capability to run one or more software applications, such as the RAN intelligent controller (RIC) 530. The virtual machine 573 may run the host operating system 576 upon which the container engine 575 may run. A virtual machine, such as virtual machine 573, may include one or more virtual processors.

A container engine 575 may run on top of the host operating system 576 in order to run multiple isolated instances (or containers) on the same operating system kernel of the host operating system 576. Containers may perform virtualization at the operating system level and may provide a virtualized environment for running applications and their dependencies. The container engine 575 may acquire a container image and convert the container image into running processes. In some cases, the container engine 575 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container can include the unit of replication. Other computing platforms may wrap one or more containers into a pod and therefore a pod can include the unit of replication.

A replication controller may be used to ensure that a specified number of replicas of a pod are running at the same time. If less than the specified number of pods are running (e.g., due to a node failure or pod termination), then the replication controller may automatically replace a failed pod with a new pod. In some cases, the number of replicas may be dynamically adjusted based on a prior number of node failures. For example, if it is detected that a prior number of node failures for nodes in a cluster running a particular network slice has exceeded a threshold number of node failures, then the specified number of replicas may be increased (e.g., increased by one). Running multiple pod instances and keeping the specified number of replicas constant may prevent users from losing access to their application in the event that a particular pod fails or becomes inaccessible.

In some embodiments, a virtualized infrastructure manager not depicted may run on the RAN 120 in order to provide a centralized platform for managing a virtualized infrastructure for deploying various components of the RAN 120. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines. In at least one embodiment, the scheduler 102 is implemented in the RIC 530, the VCU 520, or the VDU 510 to provide CA scheduling and management as described herein.

Figure 5C:
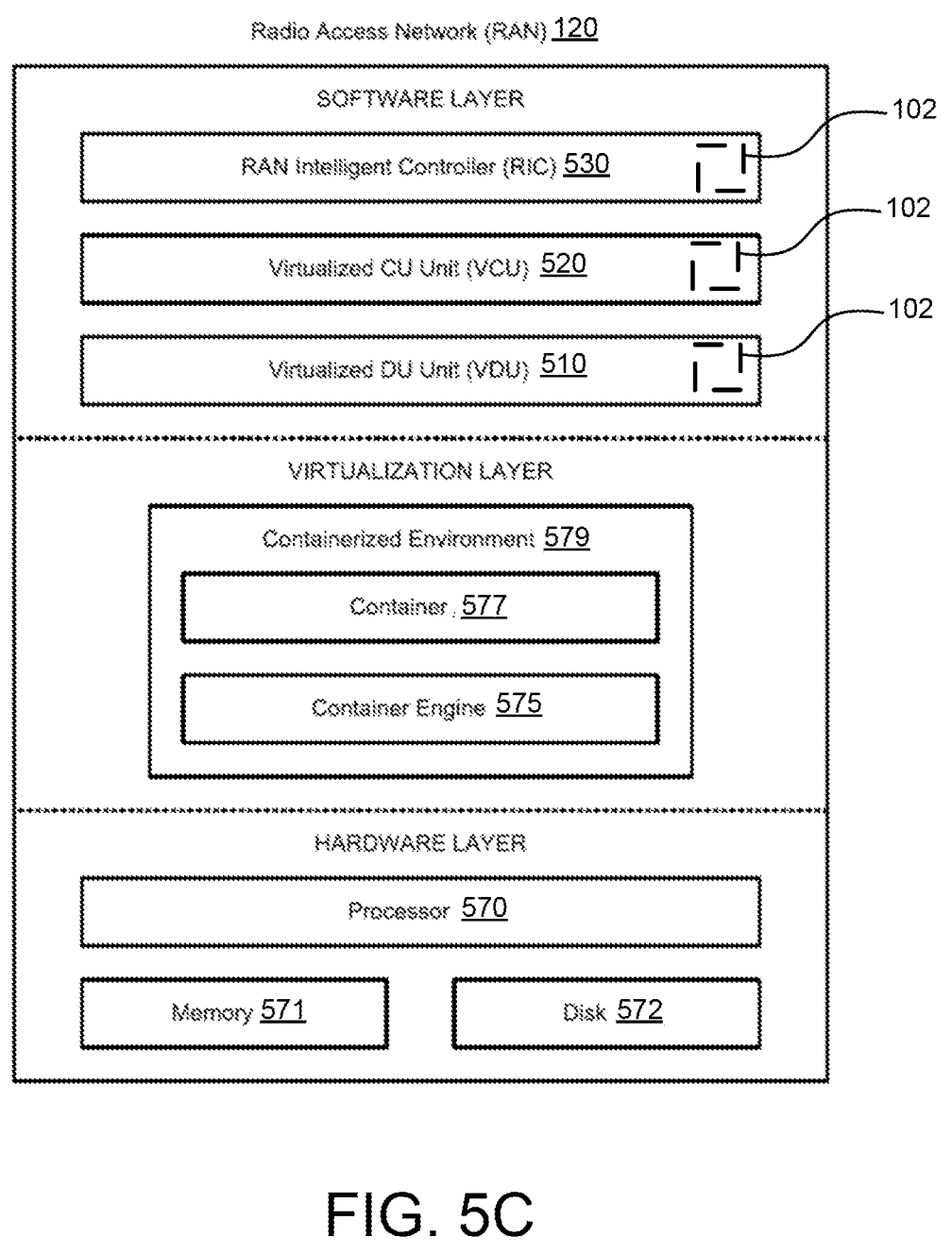

FIG. 5C depicts the RAN 120 of FIG. 5B in which the virtualization layer includes a containerized environment 579 according to at least one embodiment. The containerized environment 579 includes a container engine 575 for instantiating and managing application containers, such as container 577. Containerized applications can include applications that run in isolated runtime environments (or containers). The containerized environment 579 may include a container orchestration service for automating the deployments of containerized applications. The container 577 may be used to deploy microservices for running network functions. The container 577 may run DU components and/or CU components of the RAN 50. The containerized environment 579 may be executed using hardware-level components or executed using processor and storage components of the hardware-level components. In one example, the containerized environment 579 may be run using the processor 570, memory 571, and disk 572. In another example, the containerized environment 579 may be run using a virtual processor and a virtual memory that are themselves executed or generated using the processor 570, memory 571, and disk 572. In at least one embodiment, the scheduler 102 can be implemented in the RIC 530, the VCU 520, or the VDU 510 to provide CA scheduling and management as described herein.

Figure 5D:
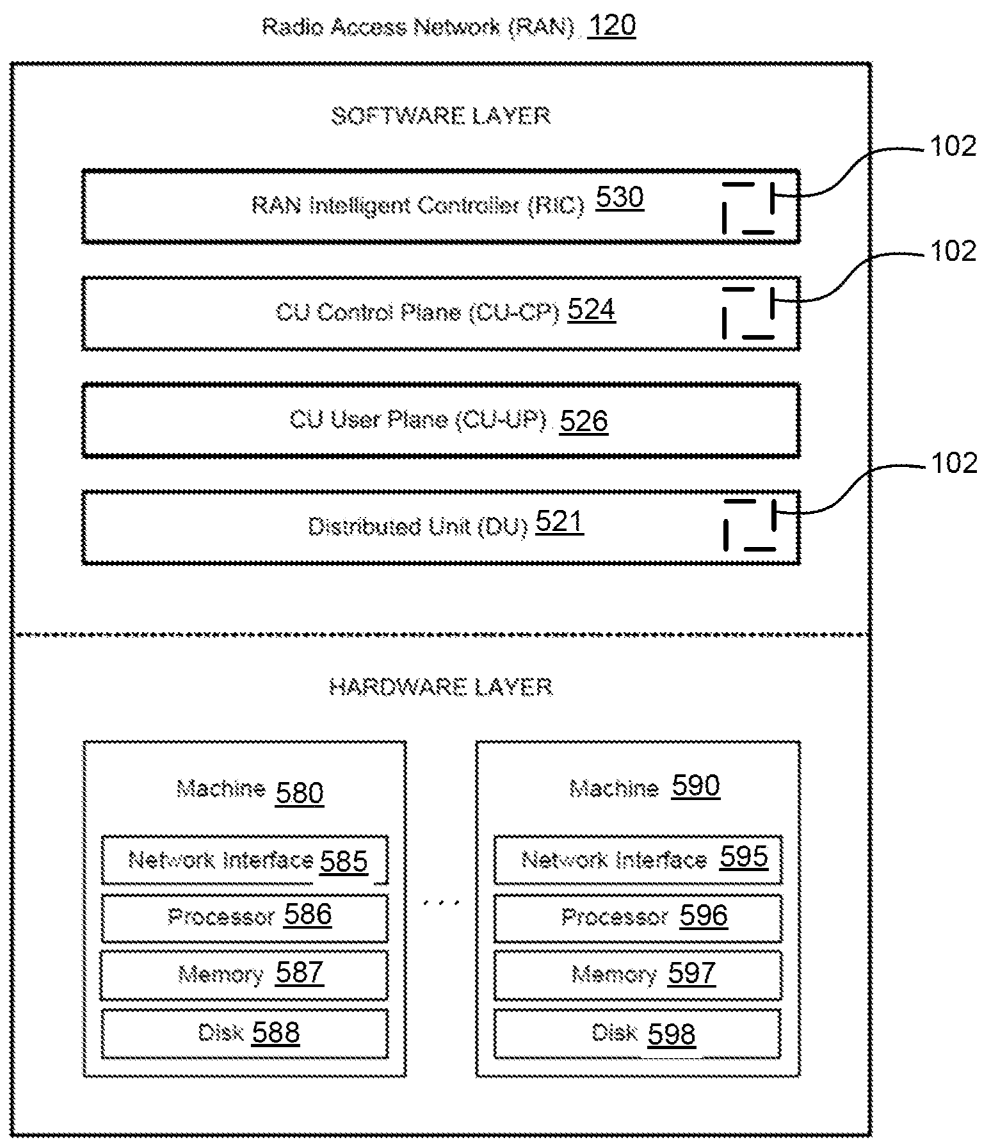

FIG. 5D depicts a RAN 120 according to at least one embodiment. As depicted, the RAN 120 includes hardware-level components and software-level components. The hardware-level components include a set of machines (e.g., physical machines) that may be grouped together and presented as a single computing system or a cluster. Each machine of the set of machines can include a node in a cluster (e.g., a failover cluster).

As depicted, the set of machines include machine 580 and machine 590. The machine 580 includes a network interface 585, processor 586, memory 587, and disk 588 all in communication with each other. Processor 586 allows machine 580 to execute computer readable instructions stored in memory 587 to perform processes described herein. Processor 586 may include one or more processing units, such as one or more CPUs and/or one or more GPUs. Memory 587 can include one or more types of memory (e.g., RAM, SRAM, DRAM, ROM, EEPROM, or Flash). The disk 588 can include a hard disk drive and/or a solid-state drive. Similarly, the machine 590 includes a network interface 595, processor 596, memory 597, and disk 598 all in communication with each other. Processor 596 allows machine 590 to execute computer readable instructions stored in memory 597 to perform processes described herein. In some embodiments, the set of machines may be used to implement a failover cluster. In some cases, the set of machines may be used to run one or more virtual machines or to execute or generate a containerized environment, such as the containerized environment 579 depicted in FIG. 5C.

The software-level components include a RAN intelligent controller (RIC) 530, CU control plane (CU-CP) 524, CU user plane (CU-UP) 526, and Distributed Unit (DU) 521. In one embodiment, the software-level components may be run using a dedicated hardware server. In another embodiment, the software-level components may be run using a virtual machine running or containerized environment running on the set of machines. In another embodiment, the software-level components may be run from the cloud (e.g., the software-level components may be deployed using a cloud-based compute and storage infrastructure). In at least one embodiment, the scheduler 102 is implemented in the RIC 530, the CU, or the DU 521 to provide a CA scheduling and management as described herein.

Figure 5E:
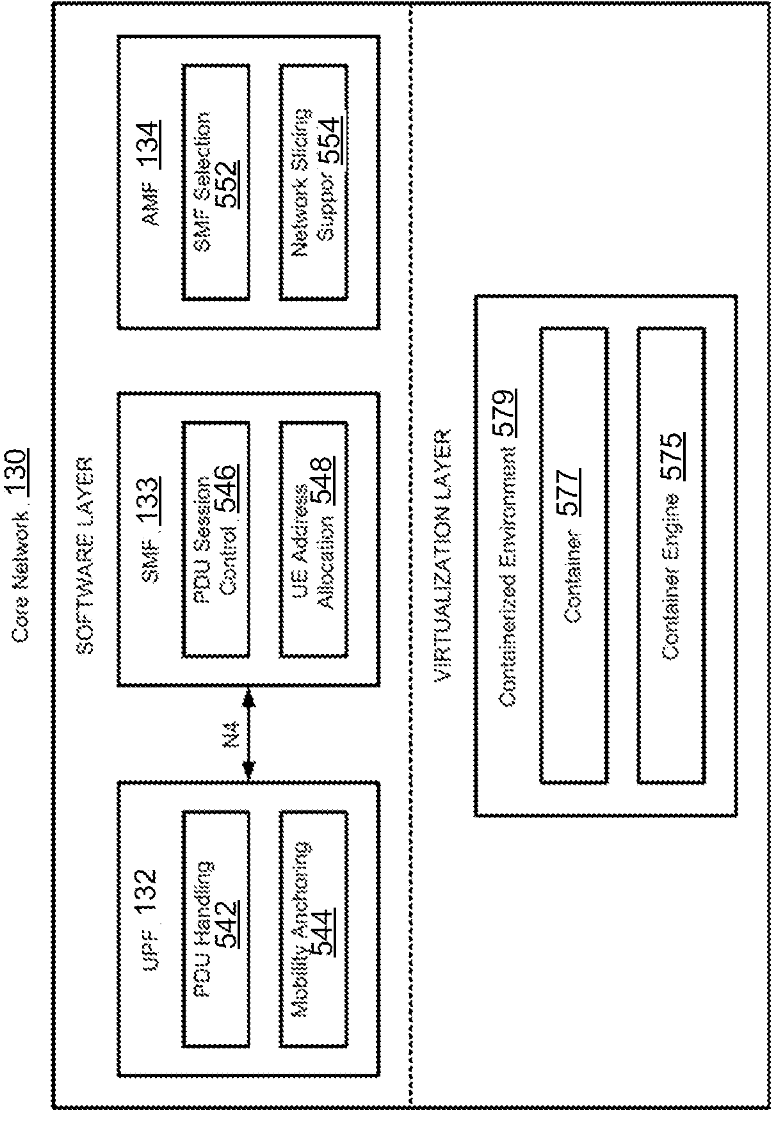
FIG. 5E depicts a core network according to at least one embodiment.

FIG. 5E depicts a core network 130 according to at least one embodiment. As depicted, the core network 130 includes implementation for core network functions UPF 132, SMF 133, and AMF 134. The core network 130 may be used to provide Internet access for user equipment via a radio access network, such as the RAN 120 in FIG. 5C. The AMF 134 may be configured to host various functions including SMF selection 552 and network slicing support 554. The UPF 132 may be configured to host various functions including mobility anchoring 544, packet data unit (PDU) handling 542, and QoS handling for the user plane. The SMF 133 may be configured to host various functions including UE IP address allocation and management 548, selection and control of user plane functions, and PDU session control 546. The core network functions may be run using containers within the containerized environment 579 that includes a container engine 575 for instantiating and managing application containers, such as container 577. In some embodiments, the containerized environment 579 may be executed or generated using a set of machines as depicted in FIG. 5D or may be executed or generated using hardware-level components, such as the processor 570, memory 571, and disk 572 depicted in FIG. 5C.

Figure 5F:
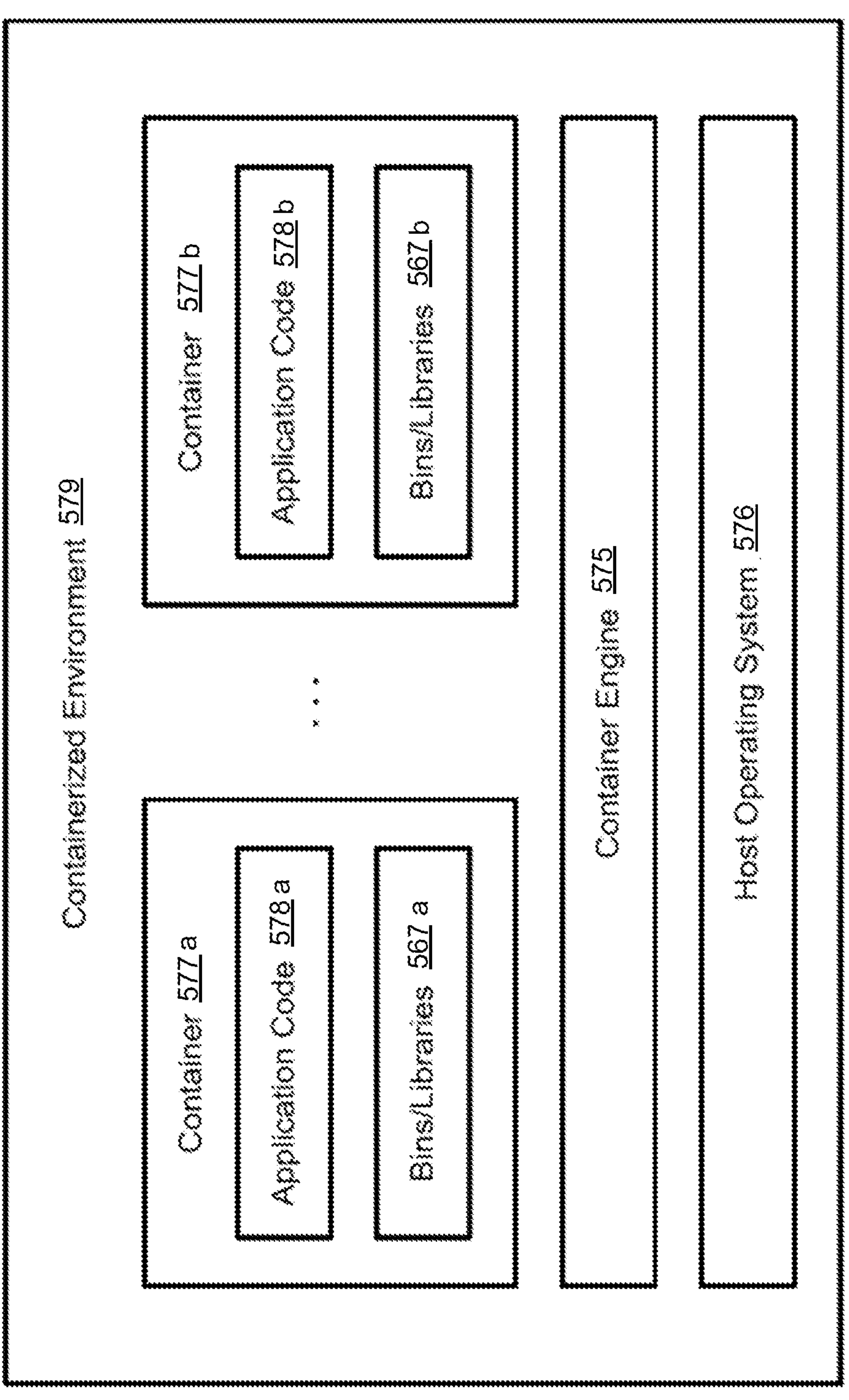
FIG. 5F depicts a containerized environment that includes a container engine running on top of a host operating system according to at least one embodiment.

FIG. 5F depicts a containerized environment 579 that includes a container engine 575 running on top of a host operating system 576 according to at least one embodiment. The container engine 575 may manage or run containers 577 on the same operating system kernel of the host operating system 576. The container engine 575 may acquire a container image and convert the container image into one or more running processes. In some cases, the container engine 575 may group containers that make up an application into logical units (or pods). A pod may contain one or more containers and all containers in a pod may run on the same node in a cluster. Each container 577 may include application code 578 and application dependencies 567, such as operating system libraries, required to run the application code 578. Containers allow portability by encapsulating an application within a single executable package of software that bundles application code 578 together with the related configuration files, binaries, libraries, and dependencies required to run the application code 578.

Figure 6A:
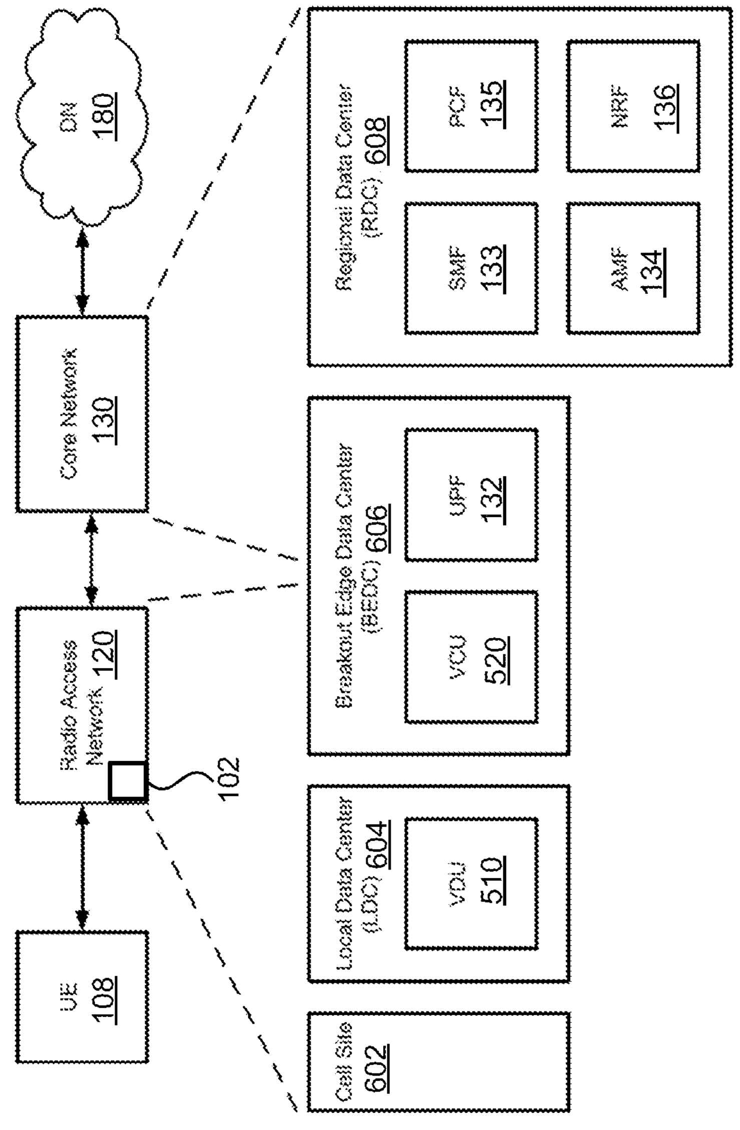
FIG. 6A-FIG. 6D depict a 5G network including implementations of a radio access network and a core network with virtualized network functions arranged within a data center hierarchy according to various embodiments.

FIG. 6A depicts a 5G network including a RAN 120 and a core network 130 according to at least one embodiment. In at least one embodiment, the scheduler 102 can be implemented in the RAN 120 to provide CA scheduling and management as described herein. The RAN 120 and the core network 130 allow user equipment UE 108 to transfer data to the data network 180 and/or to receive data from the data network 180. As depicted, the VDU 510 and VCU 520 components of the RAN 120 may be implemented using different data centers within a data center hierarchy that includes a local data center (LDC) 604 that is a first electrical distance away from the cell site 602, a breakout edge data center (BEDC) 606 that is a second electrical distance greater than the first electrical distance away from the cell site 602, and a regional data center (RDC) 608 that is a third electrical distance greater than the second electrical distance away from the cell site 602. The local data center (LDC) 604 may correspond with a first one-way latency from the cell site 602. The breakout edge data center (BEDC) 606 may correspond with a second one-way latency greater than the first one-way latency from the cell site 602. The regional data center (RDC) 608 may correspond with a third one-way latency greater than the second one-way latency from the cell site 602. The cell site 602 may include a cell tower or one or more remote radio units (RRUs) for sending and receiving wireless data transmissions. In some cases, the cell site 602 may correspond with a macrocell site or a small cell site, such as a microcell site.

In some cases, a data center may refer to a networked group of computing and storage devices that may run applications and services. The data center may include hardware servers, storage systems, routers, switches, firewalls, application-delivery controllers, cooling systems, and power subsystems. A data center may refer to a collection of computing and storage resources provided by on-premises physical servers and/or virtual networks that support applications and services across pools of physical infrastructure. Within a data center, a set of services may be connected together to provide a computing and storage resource pool upon which virtualized entities may be instantiated. Multiple data centers may be interconnected with each other to form larger networks consisting of pooled computing and storage resources connected to each other by connectivity resources. The connectivity resources may take the form of physical connections, such as Ethernet or optical communications links, and may include wireless communication channels as well. If two different data centers are connected by a set of different communication channels, the links may be combined together using various techniques including the formation of link aggregation groups (LAGs). A LAG can include a logical interface that uses the link aggregation control protocol (LACP) to aggregate multiple connections at a single direct connect endpoint.

As depicted in FIG. 6A, the VDU 510 is running within the local data center (LDC) 604 and the VCU 520 is running within the breakout edge data center (BEDC) 606. The core network functions SMF 133, AMF 134, PCF 135, and NRF 136 are running within the regional data center (RDC) 608. The user plane function UPF 132 is running within the breakout edge data center (BEDC) 606. In some embodiments, the breakout edge data center (BEDC) 606 can include an edge data center at an edge of a network managed by a cloud service provider.

One technical benefit of utilizing edge computing to move network functions closer to user equipment is that data communication latency may be reduced. The reduced latency may enable real-time interactivity between user equipment, such as UE 108 in FIG. 1A, and cloud-based services. Edge computing, including mobile edge computing, may refer to the arrangement of computing and associated storage resources at locations closer to the "edge" of a network in order to reduce data communication latency to and from user equipment (e.g., end user mobile phones). Some technical benefits of positioning edge computing resources closer to UEs include low latency data transmissions (e.g., under 5 ms), real-time (or near real-time) operations, reduced network backhaul traffic, and reduced energy consumption. The edge computing resources may be located within on-premises data centers (on-prem), near or on cell towers, and at network aggregation points within the radio access networks and core networks. Examples of applications and services that may be executed using edge computing include virtual network functions and 5G-enabled network services. The virtual network functions can include software-based network functions that are executed using the edge computing resources.

Technical benefits of dynamically assigning one or more virtualized network functions (e.g., a user plane function) to different locations or servers for execution within a data center hierarchy is that latency, power, and availability requirements may be optimized for multiple network slices over time. Technical benefits of adjusting the server location or the data center location of one or more virtualized network functions (e.g., a user plane function) for a network slice over time is that the network slice may be dynamically reconfigured to adapt to changes in latency, power, and availability requirements. In one example, a network slice may have a first configuration corresponding with a low-latency configuration in which a user plane function is deployed at a cell site and then subsequently be reconfigured to a second configuration corresponding with a low-power configuration in which the user plane function is redeployed at a breakout edge data center location.

The location of the UPF 132 (e.g., whether the UPF 132 is deployed at the local data center 604 or the breakout edge data center 606) places constraints on the transport network not depicted connecting the UPF 132 with the core network 130. For example, depending on the UPF placement location, the transport network for the backhaul (the N3 Interface) may either be minimized if the UPF is placed closer to the VCU 520 (or closer to the RAN edge) or maximized if the UPF is placed farther away from the VCU 520.

The applications and services running on the edge computing resources may communicate with a large number of UEs that may experience connectivity failures (e.g., due to battery life limitations or latency issues) over time. The applications and services may utilize heartbeat tracking techniques to manage device connectivity to the UEs.

Figure 6B:
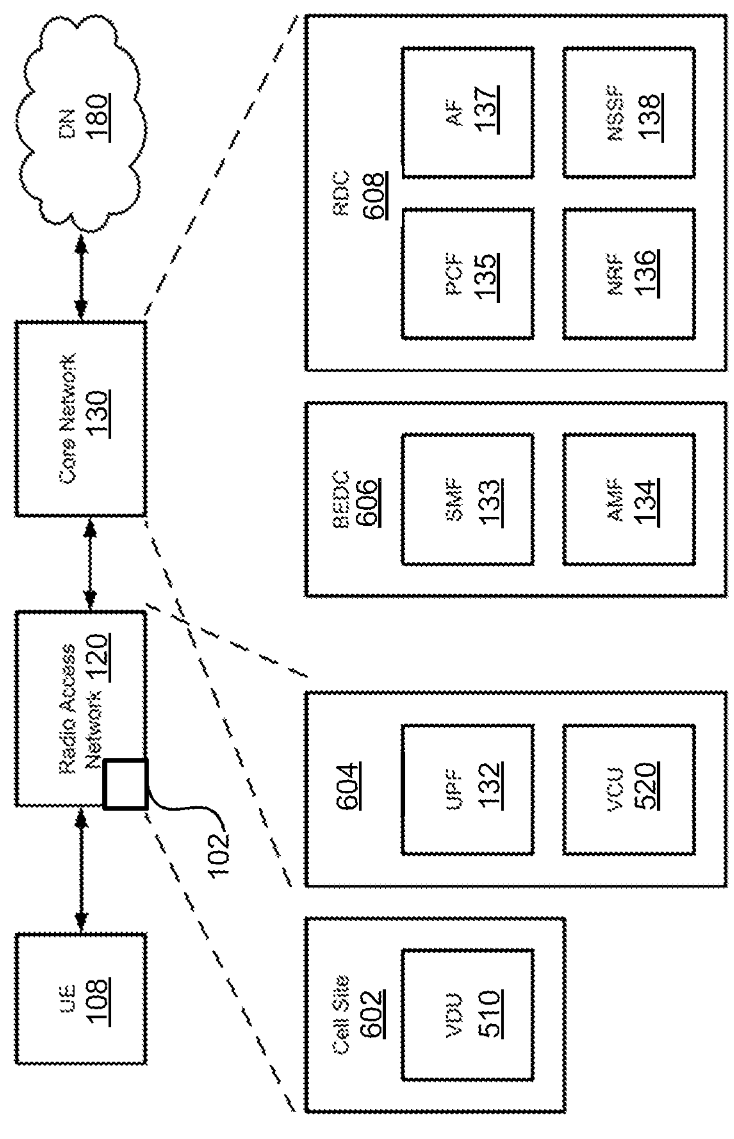

FIG. 6B depicts the 5G network depicted in FIG. 6A in which the VDU 510 has been moved to run at the cell site 602, the VCU 520 and the UPF 132 have been moved to run at the local data center (LDC) 604, and the SMF 133 and the AMF 134 have been moved to run in the breakout edge data center (BEDC) 606 according to at least one embodiment. A virtualized network function may be moved from a first data center to a second data center within a data center hierarchy by transferring an application or program code for the virtualized network function from a first server within the first data center to a second server within the second data center. In some embodiments, a second virtual processor that is instantiated and run within the second data center may acquire instructions or program code associated with a virtualized network function prior to a first virtual processor that previously run the virtualized network function within the first data center being deleted. The shifting of network functions closer to the cell site 602 and/or closer to user equipment may have been performed in response to changes in a service level agreement (SLA) or a request to establish a lower-latency network connection from user equipment to a data network. A service level agreement (SLA) may correspond with a service obligation in which penalties may apply if the SLA is violated. In some cases, SLA service metrics may include key performance indicators (KPIs), such as packet loss, latency, and guaranteed bit rate.

In some embodiments, network slices may be reconfigured in order to satisfy traffic isolation requirements, end-to-end latency requirements (e.g., the round-trip time between two end points in a network slice), and throughput requirements for each slice of the network slices. In some cases, the traffic isolation, end-to-end latency, and throughput requirements may vary as a function of a priority level assigned to a given network slice (e.g., whether a network slice have been assigned a high priority or a low priority).

In some embodiments, a first data center and a second data center within a data center hierarchy may both have the same applications or program code stored thereon such that both data centers can run one or more of the same virtualized network functions. In at least one such embodiment, a virtualized network function may be moved from the first data center to the second data center by transferring control or execution of the virtualized network function from the first data center to the second data center without transferring applications or program code.

Figure 6C:
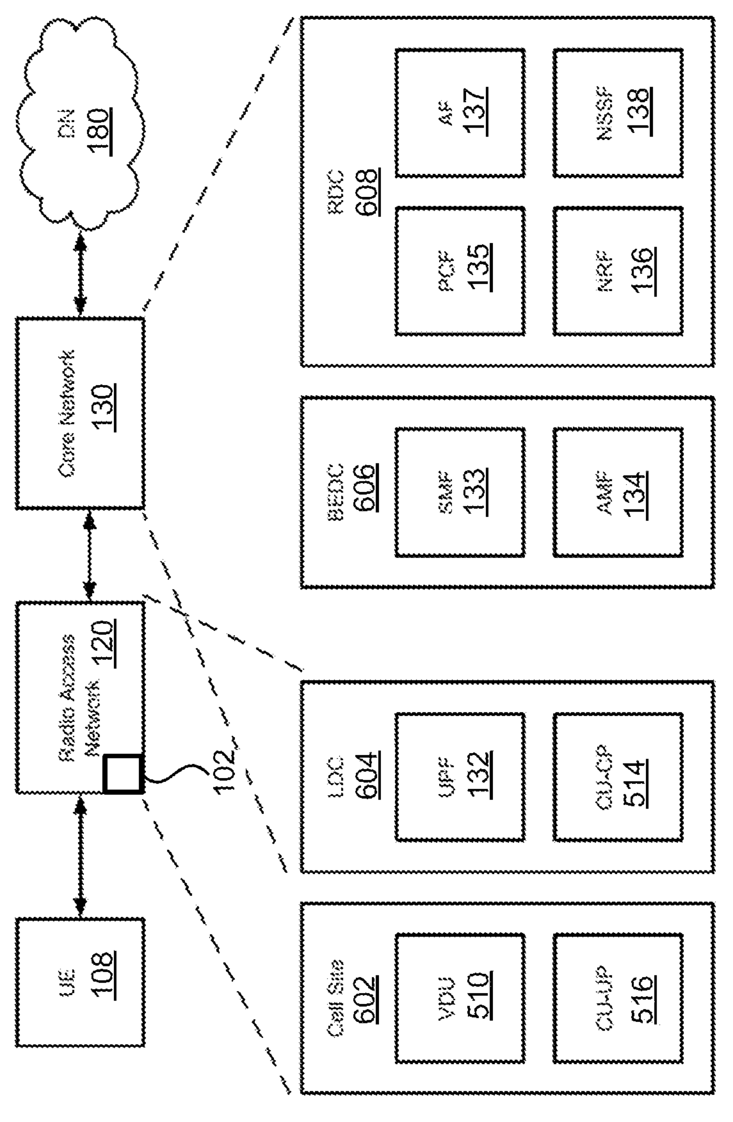

FIG. 6C depicts the 5G network depicted in FIG. 6B in which the VCU 520 has been partitioned such that the CU-CP 514 may run at the local data center (LDC) 604 and the CU-UP 516 may be moved to run at the cell site 602 according to at least one embodiment. The cell site 602 may include computing and storage resources for running containerized applications.

Figure 6D:
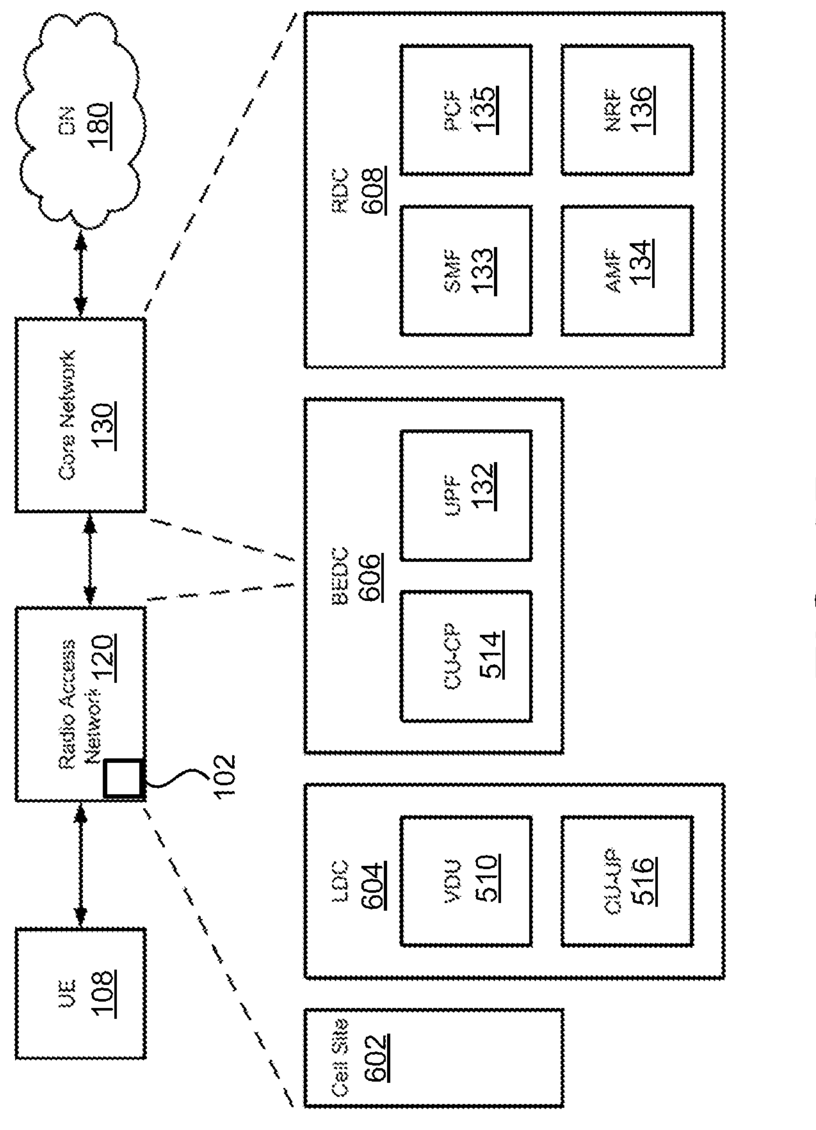

FIG. 6D depicts the 5G network depicted in FIG. 6C in which the CU-CP 514 and the UPF 132 have been moved to run in the breakout edge data center (BEDC) 606, the VDU 510 and the CU-UP 516 have been moved to run at the local data center (LDC) 604, and the SMF 133 and the AMF 134 have been moved to run in the regional data center (RDC) 608 according to at least one embodiment. Deploying the VDU 510 and the CU-UP 516 in the local data center (LDC) 604 may allow the VDU 510 to more efficiently support a number of cell sites including the cell site 602. In some embodiments, the scheduler 102 is located within the RAN 120 to perform the CA scheduling and management as disclosed herein.

A data center hierarchy may include a set of data centers that span across different geographic regions. A region may correspond with a large geographical area in which multiple data centers are deployed to provide different cloud services. Each data center within the region may include a server cluster. A server cluster (or cluster) can include a set of physical machines that are connected together via a network. The cluster may be used to process and store data and to run applications and services in a distributed manner. Applications and data associated with the applications may be replicated or mirrored over a set of machines within a cluster to improve fault tolerance. Each machine in a cluster can include a node in the cluster. In at least one example, the cluster can include a failover cluster.

Geo-redundancy may be achieved by running applications or services across two or more availability zones within the same region. Geo-redundancy may refer to the physical placement of servers or server clusters within geographically diverse data centers to safeguard against catastrophic events and natural disasters.

An availability zone can include a smaller geographical area that is smaller than the large geographical area of the region. Multiple availability zones may reside within a region. An availability zone can include one or more data centers with redundant power, networking, and connectivity within a region.

Each region can include a separate geographical area that does not overlap with any other regions. A logical grouping of one or more data centers within a region may correspond with an availability zone. Each region may include multiple availability zones that can include multiple isolated geographical areas within the region. The data centers within the availability zones of a region may be physically isolated from each other inside the region to improve fault tolerance.

Each availability zone inside a geographical region may utilize its own power, cooling, and networking connections. An application may be deployed across two or more availability zones in order to ensure high availability. In this case, if a first availability zone goes down (e.g., due to a power failure) within a geographical region, then the application may still be accessible and running within a second availability zone. Each availability zone within the geographical region may be connected to each other with high bandwidth, low latency network connections to enable synchronous replication of applications and services across the two or more availability zones.

A local zone may correspond with a small geographical region in which one or more data centers are deployed to provide low latency (e.g., single-digit millisecond latency) applications and services. User equipment that is located within the small geographical region or that is located within a threshold distance (e.g., within two miles) of the small geographical region may be able to provide low latency services. A data center within a local zone may allow a direct private connection to compute and storage resources without requiring access to the Internet. The direct private connection may utilize fiber optic cables to allow a server within the local zone to privately connect to other data centers without requiring access to the Internet.

Figure 7:
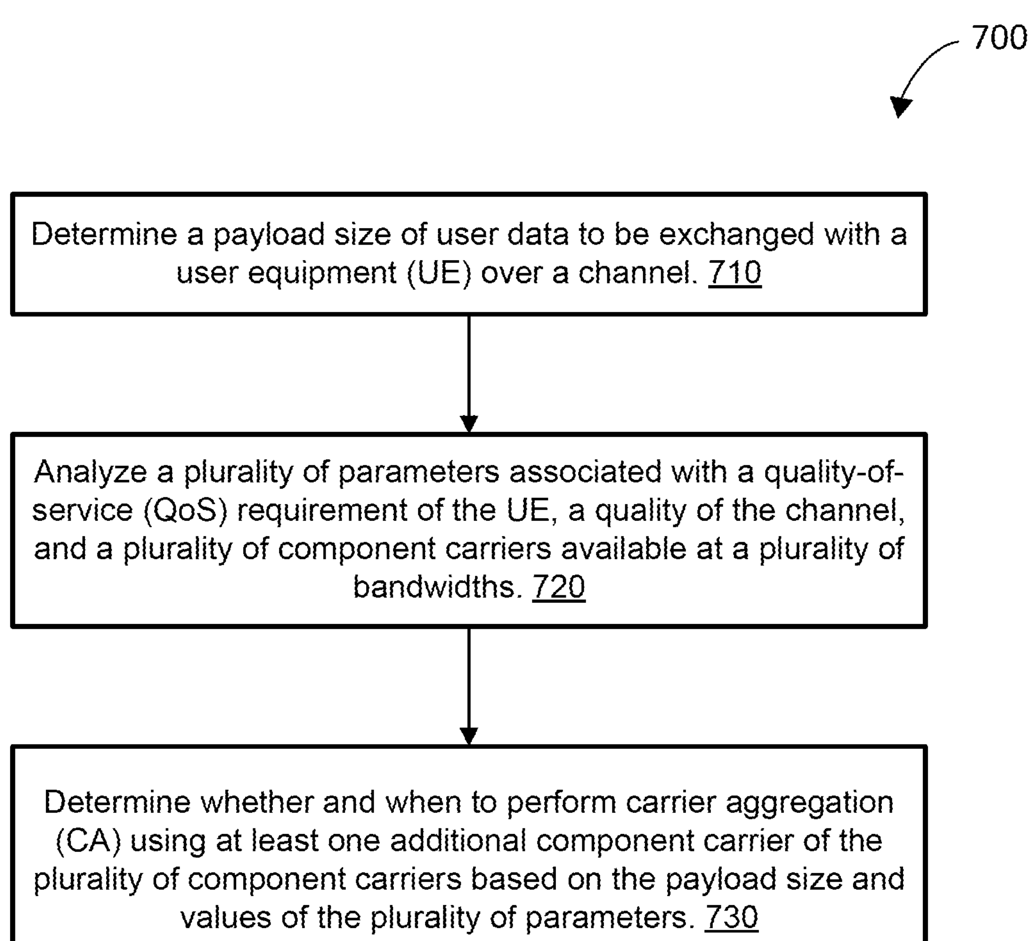
FIG. 7 is a flow diagram of a method of scheduling and managing CA in a cellular network according to at least one embodiment.

FIG. 7 is a flow diagram of a method 700 of scheduling and managing CA in a cellular network according to at least one embodiment. The method 700 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 700 is performed by the DU 121 of FIGS. 1A-1B. In various embodiments, the method 700 is performed by the scheduler 102 or 202. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the processing logic determines a payload size of user data to be exchanged with a user equipment (UE) over a channel.

At operation 720, the processing logic analyzes a plurality of parameters associated with a quality-of-service (QOS)

requirement of the UE, a quality of the channel, and a plurality of component carriers available at a plurality of bandwidths.

At operation 730, the processing logic determines whether and when to activate carrier aggregation (CA) for the UE using at least one additional component carrier of the plurality of component carriers based on the payload size and values of the plurality of parameters In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions. One or more non-transitory, computer-readable storage media can have computer-readable instructions stored thereon which, when executed by one or more processing devices, cause the one or more processing devices to perform the operations described herein.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A computing system to facilitate a cellular network, the computing system comprising:

one or more processing devices; and memory communicatively coupled with and readable by the one or more processing devices and having stored therein processor-readable instructions which, when executed by the one or more processing devices, cause the one or more processing devices to perform operations comprising:

determining a payload size of user data to be exchanged with a user equipment (UE) over a channel;

analyzing a plurality of parameters associated with a quality-of-service (QoS) requirement of the UE, a quality of the channel, and a plurality of component carriers available at a plurality of bandwidths;

determining whether and when to activate carrier aggregation (CA) for the UE using at least one additional component carrier of the plurality of component carriers based on the payload size and values of the plurality of parameters; and determining a maximum value of the payload size before activating the CA based on a physical resource block (PRB) utilization level, a maximum number of UEs supportable by a connected cell, data volume, and data throughput of a plurality of channels of the connected cell.

2. The computing system of claim 1, wherein the one or more processing devices are located within a distributed unit of a radio access network, and wherein the operations further comprise activating the CA using one of intra-band contiguous CA, intra-band non-contiguous CA, inter-band CA, or inter-RAT (radio access technology) CA.

3. The computing system of claim 1, wherein determining the maximum value of the payload size includes minimizing the PRB utilization level and the maximum number of UEs.

4. The computing system of claim 1, wherein the plurality of parameters further include at least one of a mobility level of the UE, an energy efficiency level of the UE, or a cost impact of operating the cellular network.

5. The computing system of claim 1, wherein the operations further comprise determining, based on the payload size and values of the plurality of parameters, how many component carriers to combine when activating CA.

6. The computing system of claim 1, wherein the operations further comprise:

determining that at least one of a level of PRB utilization or a number of connected UEs satisfy a threshold value; and delaying activation of the CA by a predetermined length of time to improve QoS for the UE, wherein the predetermined length of time is based on the payload size.

7. The computing system of claim 1, wherein the operations further comprise:

determining that at least one of a level of PRB utilization or a number of connected UEs does not satisfy a threshold value; and immediately activating the CA when the payload size does not satisfy a particular size.

8. The computing system of claim 1, wherein the operations further comprise:

determining that a signal coverage from a connected cell is below a threshold value; and immediately activating the CA over multiple component carriers from different frequency bands.

9. The computing system of claim 1, wherein the operations further comprise:

determining that the UE is streaming video of a definition that exceeds a threshold value; and immediately activating the CA over multiple component carriers to at least one of increase a data rate or reduce a latency of streaming the video.

10. A method of operating a scheduler of a radio access network, the method comprising:

determining, by one or more processing devices, a payload size of user data to be exchanged with a user equipment (UE) over a channel;

analyzing a plurality of parameters associated with a quality-of-service (QoS) requirement of the UE, a quality of the channel, and a plurality of component carriers available at a plurality of bandwidths;

determining, by the one or more processing devices, whether and when to activate carrier aggregation (CA) for the UE using at least one additional component carrier of the plurality of component carriers based on the payload size and values of the plurality of parameters; and determining, by the one or more processing devices, a maximum value of the payload size before activating the CA based on a physical resource block (PRB) utilization level, a maximum number of UEs supportable by a connected cell, data volume, and data throughput of a plurality of channels of the connected cell.

11. The method of claim 10, further comprising:

executing the scheduler using a distributed unit of the radio access network, wherein the distributed unit coordinates transmission over the plurality of component carriers; and activating the CA using one of intra-band contiguous CA, intra-band non-contiguous CA, inter-band CA, or inter-RAT (radio access technology) CA.

12. The method of claim 10, wherein determining the maximum value of the payload size includes minimizing the PRB utilization level and the maximum number of UEs.

13. The method of claim 10, wherein the plurality of parameters further include at least one of a mobility level of the UE, an energy efficiency level of the UE, or a cost impact of operating a cellular network that includes the radio access network.

14. The method of claim 10, further comprising determining, based on the payload size and values of the plurality of parameters, how many component carriers to combine when activating CA.

15. The method of claim 10, further comprising:

determining that at least one of a level of PRB utilization or a number of connected UEs satisfy a threshold value; and delaying activation of the CA by a predetermined length of time to improve QoS for the UE, wherein the predetermined length of time is based on the payload size.

16. The method of claim 10, further comprising:

determining that at least one of a level of PRB utilization or a number of connected UEs does not satisfy a threshold value; and immediately activating the CA when the payload size does not satisfy a particular size.

17. The method of claim 10, further comprising:

determining that a signal coverage from a connected cell is below a threshold value; and immediately activating the CA over multiple component carriers from different frequency bands.

18. The method of claim 10, further comprising:

determining that the UE is streaming video of a definition that exceeds a threshold value; and immediately activating the CA over multiple component carriers to at least one of increase a data rate or reduce a latency of streaming the video.

19. A non-transitory computer-readable storage medium storing instructions, which when executed by one or more processing devices of a cellular network, cause the processing devices to perform operations comprising:

determining a payload size of user data to be exchanged with a user equipment (UE) over a channel;

analyzing a plurality of parameters associated with a quality-of-service (QoS) requirement of the UE, a quality of the channel, and a plurality of component carriers available at a plurality of bandwidths;

determining whether and when to activate carrier aggregation (CA) for the UE using at least one additional component carrier of the plurality of component carriers based on the payload size and values of the plurality of parameters; and determining a maximum value of the payload size before activating the CA based on a physical resource block (PRB) utilization level, a maximum number of UEs supportable by a connected cell, data volume, and data throughput of a plurality of channels of the connected cell.

* * * * *